US009622113B2

(12) United States Patent
Hirata

(10) Patent No.: US 9,622,113 B2
(45) Date of Patent: Apr. 11, 2017

(54) BASE STATION APPARATUS AND RADIO ACCESS SYSTEM

(71) Applicant: FUJITSU LIMITED, Kawasaki-shi, Kanagawa (JP)

(72) Inventor: Akira Hirata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/217,646

(22) Filed: Jul. 22, 2016

(65) Prior Publication Data

US 2016/0330650 A1 Nov. 10, 2016

Related U.S. Application Data

(63) Continuation of application No. PCT/JP2014/052795, filed on Feb. 6, 2014.

(51) Int. Cl.
| H04W 74/04 | (2009.01) |
| H04W 28/06 | (2009.01) |
| H04W 4/06 | (2009.01) |
| H04W 4/12 | (2009.01) |
| H04W 4/22 | (2009.01) |
| H04W 72/12 | (2009.01) |

(52) U.S. Cl.
CPC .......... *H04W 28/065* (2013.01); *H04W 4/06* (2013.01); *H04W 4/12* (2013.01); *H04W 4/22* (2013.01); *H04W 72/1242* (2013.01); *H04W 72/1257* (2013.01); *H04W 72/1252* (2013.01)

(58) Field of Classification Search
CPC ................................ H04L 5/003; H04W 74/04
USPC ............................ 455/452.1, 509, 67.11, 126
See application file for complete search history.

(56) References Cited

U.S. PATENT DOCUMENTS 5,982,294 A * 11/1999 Takayama ........... H04W 88/026
                                                    340/7.32
7,715,343 B2 * 5/2010 Tomioka ............... H04W 48/18
                                                    370/328

(Continued)

FOREIGN PATENT DOCUMENTS

JP   2006-268754 A   10/2006
JP   2011-504327 A   2/2011

(Continued)

OTHER PUBLICATIONS

Ericsson, "Change in Scheduling Information for ETWS and CMAS", ST-Ericsson, Feb. 10, 2012.

(Continued)

*Primary Examiner* — John J Lee
(74) *Attorney, Agent, or Firm* — Arent Fox LLP

(57) ABSTRACT

A base station apparatus that divides a message into a data of a transmittable size to a terminal apparatus, and transmits the divided data to subordinate all the terminal apparatuses by broadcast, the base station apparatus including: a radio utilization rate calculation unit configured to calculate a radio utilization rate indicating a rate of a time for transmission of one of the message with respect to a transmission period of each the message in case of transmitting the message repetitively, based on a number of repetition times of each the divided data and a transmission period of each the divided data; and a transmission decision unit configured to determine a transmission schedule of the data based on the radio utilization rate.

17 Claims, 18 Drawing Sheets

(56) References Cited

U.S. PATENT DOCUMENTS

| | | |
|---|---|---|
| 2006/0218558 A1 | 9/2006 | Torii et al. |
| 2012/0096466 A1 | 4/2012 | Sun |
| 2015/0181576 A1* | 6/2015 | Papasakellariou .... H04L 5/0053 370/329 |
| 2015/0279122 A1* | 10/2015 | Lorenzen ............. G07B 15/063 705/13 |

FOREIGN PATENT DOCUMENTS

| | | |
|---|---|---|
| JP | 2012-517041 A | 7/2012 |
| JP | 2013-534064 A | 8/2013 |
| WO | WO 2009/061794 A2 | 5/2009 |
| WO | WO 2010/089900 A1 | 8/2010 |
| WO | WO 2011/158297 A1 | 12/2011 |
| WO | WO 2013/024581 A1 | 2/2013 |

OTHER PUBLICATIONS

3$^{rd}$ Generation Partnership Project, "3GPP TS 36.413 V9 8.0", Technical Specification Group Radio Access Network, Evolved Universal Terrestrial Radio Access Network (E-UTRAN), S1 Application Protocol (S1AP), Release 9, Dec. 2011.

3$^{rd}$ Generation Partnership Project, "3GPP TS 36.331 V9.16.0", Technical Specification Group Radio Access Network, Evolved Universal Terrestrial Radio Access (E-UTRA), Radio Source Contol (RCC), Protocol specification, Release 9, Sep. 2013.

International Search Report of International Patent Application No. PCT/JP2014/052795 dated Apr. 28, 2014.

* cited by examiner

FIG.10A

S1AP:WRITE-REPLACE WARNING REQUEST
(WITHOUT "WARNING TYPE"=CMAS, MESSAGE
TRANSMISSION PERIOD=RP, MESSAGE CONTENT=CMAS#1)

FIG.10B

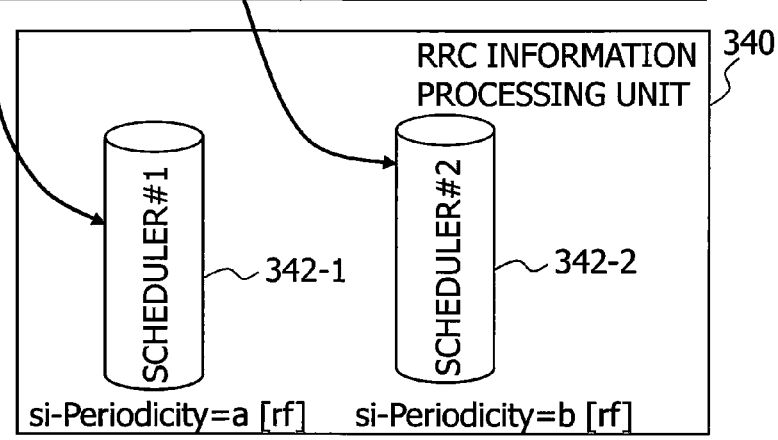

FIG.10C

| TRANSMISSION PERIOD OF ONE MESSAGE | ... | $a \times N \times \alpha$ | $b \times N \times \beta$ |
| RADIO UTILIZATION RATE (Radio Utilization) | ... | $\dfrac{a \times N \times \alpha}{RP}$ | $\dfrac{b \times N \times \beta}{RP}$ |

FIG.10D

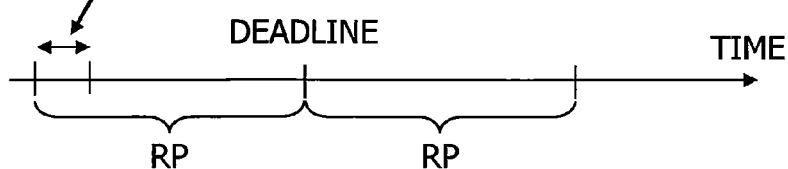

FIG.10E

DATA STORAGE UNIT 350

| PRIORITY | | SCHEDULER#1 | SCHEDULER#2 | |
|---|---|---|---|---|
| 2 | CMAS#1 | 0.2 | 0.15 | ... |
| 1 | CMAS#2 | 0.15 | 0.2 | |
| ⋮ | ⋮ | ⋮ | ⋮ | |

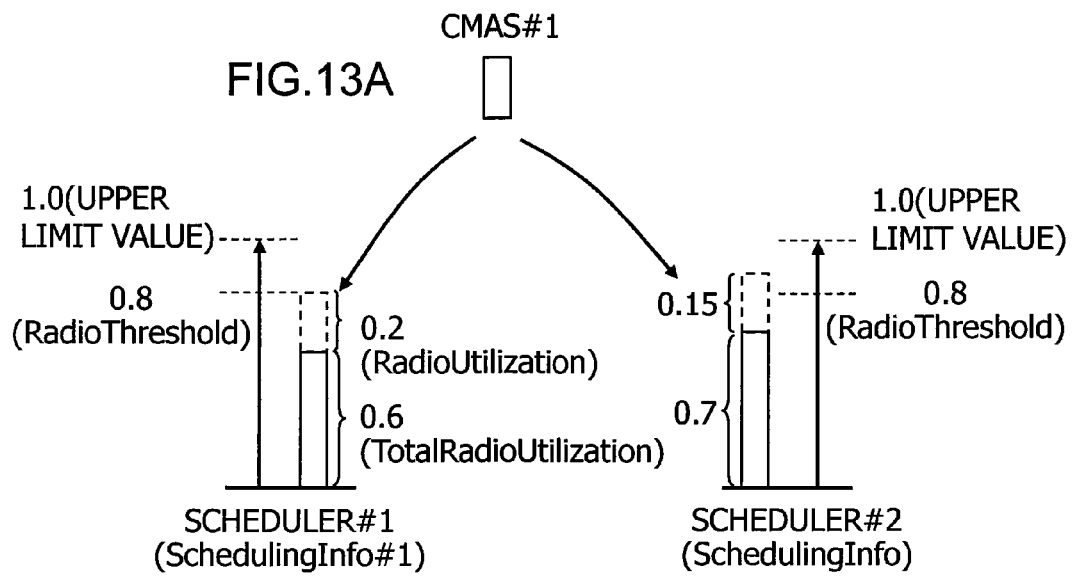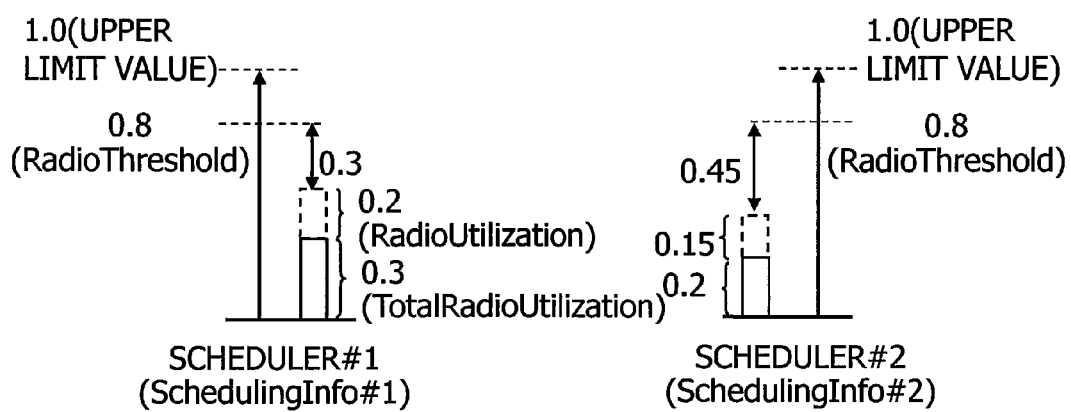

FIG.16A

| PARAMETERS | SIGNIFICATION |
|---|---|
| Message Identifier | MESSAGE IDENTIFIERS |
| Serial Number | |
| Repetition Period | INDICATING MESSAGE TRANSMISSION PERIOD |
| Number of Broadcasts Requested | INDICATING MESSAGE TRANSMISSION COUNT |
| Warning Type | INDICATING DISASTER TYPE ONLY INCLUDED IN ETWS |
| Warning Message Contents | MESSAGE CONTENTS |

FIG.16B

| PARAMETERS | SIGNIFICATION |
|---|---|
| messageidentifier | MESSAGE IDENTIFIERS |
| serialNumber | |
| warningType | INDICATING DISASTER TYPE |

FIG.17A

| PARAMETERS | SIGNIFICATION |
|---|---|
| messageIdentifier | MESSAGE IDENTIFIERS |
| serialNumber | |
| warningMessageSegmentType | IDENTIFIER WHETHER THE LAST SEGMENT OF DIVIDED MESSAGE |
| warningMessageSegmentNumber | DIVIDED MESSAGE NUMBER |
| warningMessageSegment | MESSAGE CONTENTS |

FIG.17B

| PARAMETERS | SIGNIFICATION |
|---|---|
| messageIdentifier-r9 | MESSAGE IDENTIFIERS |
| serialNumber -r9 | |
| warningMessageSegmentType -r9 | IDENTIFIER WHETHER THE LAST SEGMENT OF DIVIDED MESSAGE |
| warningMessageSegmentNumber-r9 | DIVIDED MESSAGE NUMBER |
| warningMessageSegment-r9 | MESSAGE CONTENTS |

FIG.18

```
SchedulingInfoList ::=    SEQUENCE (SIZE (1..maxSI-Message)) OF SchedulingInfo SchedulingInfo ::=              SEQUENCE {
        si-Periodicity    ENUMERATED {rf8, rf16, rf32, rf64, rf128, rf256, rf512},
        sib-MappingInfo SIB-MappingInfo
}

SIB-MappingInfo ::=    SEQUENCE (SIZE (0..maxSIB-1)) OF SIB-Type
SIB-Type ::=           ENUMERATED {sibType3, sibType4, sibType5, sibType6,
                                   sibType7, sibType8, sibType9, sibType10,
                                   sibType11, sibType12-v920, sibType13-v920,
                                   sibType14-v1130, sibType15-v1130,
                                   sibType16-v1130, spare2, spare1, ...}
```

BASE STATION APPARATUS AND RADIO ACCESS SYSTEM

CROSS-REFERENCE TO RELATED APPLICATION

This application is a continuation application of International Application Number PCT/JP2014/052795 filed on Feb. 6, 2014 and designated the U.S., the entire contents of which are incorporated herein by reference.

FIELD

The present invention relates to a base station apparatus and a radio access system.

BACKGROUND

A radio access system such as a mobile telephone system and a wireless LAN (Local Area Network) is widely used today. Also, in the field of radio communication, next generation communication technology is continuously being discussed in order to further improve a communication speed and a communication capacity. For example, in the 3GPP (3rd Generation Partnership Project), which is an association for standardization, the standardization of a communication standard called LTE (Long Term Evolution) and the standardization of a communication standard called LTE-A (LTE-Advanced) are completed or currently under study.

In such a radio communication system, there is a case when a base station apparatus distributes information in broadcast to all terminal apparatuses which are existent in the coverage of the self-station. As such a distribution system, there are an ETWS (Earthquake and Tsunami Warning System) and a CMAS (Commercial Mobile Alert System), for example.

The ETWS is, for example, a system which distributes highly urgent information of a tsunami, an earthquake, etc. to a terminal apparatus. Also, the CMAS is, for example, a system which distributes wide information such as a presidential message, an advertisement of a commercial product to a terminal apparatus.

In regard to the ETWS and the CMAS, the base station apparatus receives from an MME (Mobile Management Entity) a "WRITE-REPLACE WARNING REQUEST" (which may hereafter be referred to as an "S1AP: WRITE-REPLACE WARNING REQUEST"), that is, an S1 Application Protocol (S1AP) Message. Taking the opportunity of receiving the message concerned, the base station apparatus distributes the message to the terminal apparatus. In this case, there is also a case that there exists an upper-level apparatus which instructs the MME to transmit the "S1AP: WRITE-REPLACE WARNING REQUEST" to the base station apparatus.

FIG. 16A illustrates an example of parameters (or IE: Information Elements) which are included in the "S1AP: WRITE-REPLACE WARNING REQUEST". The "S1AP: WRITE-REPLACE WARNING REQUEST" includes each parameter of "Message Identifier", "Serial Number", "Repetition Period", "Number of Broadcasts Requested", "warning type" and "Warning Message Contents".

The "Message Identifier" and the "Serial Number" represent identifiers which identify, for example, a message content. The "Message Identifier" and the "Serial Number" are used, for example, in a radio section also, so that the terminal apparatus can confirm the duplicated reception etc. of a message using the above two parameters.

The "Repetition Period" denotes a transmission period of the message content, for example. Also, the "Number of Broadcasts Requested" denotes the number of transmission times of the message content, for example.

The "warning type" denotes a disaster type, for example, which is a parameter included in the ETWS, whereas the parameter is not included in the CMAS. In the "Warning Message Contents", a message content is included, for example.

The base station apparatus receives the "S1AP: WRITE-REPLACE WARNING REQUEST" from the MME, to distribute the message content included in the "S1AP: WRITE-REPLACE WARNING REQUEST" to the terminal apparatus.

For example, the base station apparatus distributes the message content using SI (System Information) which is notification information. In SI, ten or more SIB types (System Information Block types) are defined. In the ETWS, an SIB10 and an SIB11 are used. For example, the base station apparatus first distributes the SIB10 to notify the terminal apparatus of the advent of a disaster, and then distributes the SIB11 to transmit concrete information of the disaster. On the other hand, in the CMAS, a single SIB12 type is used.

Examples of parameters included in the SIB10, the SIB11 and the SIB12 are depicted in FIG. 16B, FIG. 17A and FIG. 17B, respectively.

In the SIB10, "messageIdentifier", "serialNumber" and "warningType" are included.

The "messageIdentifier" and the "serialNumber" correspond to the "Message Identifier" and the "Serial Number" in the "S1AP: WRITE-REPLACE WARNING REQUEST", respectively, so as to represent each identifier to identify the message content.

The "warningType" corresponds to the "warning type" in the "S1AP: WRITE-REPLACE WARNING REQUEST" to represent a disaster type.

In the SIB11, "messageIdentifier", "serialNumber", "warningMessageSegmentType", "warningMessageSegmentNumber" and "warningMessageSegment" are included.

In the "messageIdentifier" and the "serialNumber", the same information as the "messageIdentifier" and the "serialNumber" in SIB10 is included, respectively.

In the base station apparatus, for example, a message content included in the "Warning Message Contents" of "S1AP: WRITE-REPLACE WARNING REQUEST" is divided into each segment of a size that can be transmitted to the terminal apparatus. Then in the base station apparatus, each divided segment is transmitted through each SIB11.

The "warningMessageSegmentType" represents an identifier indicating the last segment of the divided message, for example. Also, the "warningMessageSegmentType" represents, for example, the number of each divided message. Further, the "warningMessageSegment" represents, for example, a message content. Based on the above parameters, for example, the terminal apparatus unifies the segments to reproduce a message.

The SIB12 includes, for example, parameters equivalent to the SIB11. An "r9" included in the parameter represents Release 9.

With regard to timing in which the base station apparatus transmits each SIB after an SIB3, the timing is specified by "SchedulingInfo" which is included in an SIB1. The "SchedulingInfo" is notified from the base station apparatus to the terminal apparatus. The terminal apparatus waits for each SIB at timing specified by the "SchedulingInfo".

FIG. 18 illustrates an example of setting parameters of "SchedulingInfo" included in the SIB1. The "SchedulingInfo" includes two parameters which are "si-Periodicity" and "SIB-MappingInfo".

By the "si-Periodicity", for example, an SIB transmission period is designated on the basis of each radio frame (1 radio frame=10 subframe=0.01 second). Also, by the "SIB-MappingInfo", for example, there is designated an SIB type which is to be transmitted at a period designated by the "si-Periodicity". As depicted in FIG. 18, the transmission period of each SIB can be set from among a plurality of transmission periods.

Additionally, there is a difference between a value of "Repetition Period" in the "S1AP: WRITE-REPLACE WARNING REQUEST" which the base station apparatus receives from the MME and a value of the "si-Periodicity" included in the "SchedulingInfo" which the base station apparatus transmits to the terminal apparatus. For example, the "Repetition Period" is a message transmission period of which unit is a second. On the other hand, the "si-Periodicity" is an SIB transmission period of which unit is a radio frame.

CITATION LIST

Non-Patent Literature

Non-Patent Literature 1: 3GPP TS 36.413 V9.8.0 (2011-12)
Non-Patent Literature 2: 3GPP TS 36.313 V9.16.0 (2013-09)

SUMMARY

In the ETWS, for example, the base station apparatus is not allowed to simultaneously transmit a plurality of messages to the terminal apparatus. The reason is that, for example, if the base station apparatus intends to simultaneously transmit a plurality of messages, a conflict may occur in transmission timing, causing the occurrence of a transmission delay or an arrival failure of the messages.

On the other hand, in the CMAS, for example, the base station apparatus is allowed to simultaneously transmit a plurality of messages to the terminal apparatus. However, the "Repetition Period" indicative of a transmission period exists in each message, so that one message is transmitted within a limited time, for example. Further, the transmission timing of an SIB12 which carries each segment is also designated by the "si-Periodicity", and the total number of transmission times is also restricted by the "Repetition Period", for example.

In the 3GPP which is working toward standardization does not provide for the SIB12 transmission schedule to perform message distribution from the base station apparatus. Therefore, each vender can implement the SIB12 transmission schedule on the apparatus without restriction of the provision by the 3GPP.

However, in a case when the base station apparatus transmits a message through the SIB12, there may be a case that, if the SIB12 transmission schedule is not implemented, the transmission of all segments is not possible within a message transmission period indicated by the "Repetition Period".

Also, during the transmission of one message through the SIB12, when another message is to be transmitted through the SIB12, there may be a case that the transmission of the other message is not possible within a message transmission period "Repetition Period", if the SIB12 transmission schedule is not implemented.

Further, in the CMAS, although the base station apparatus can simultaneously transmit a plurality of types of messages, in a case that the SIB12 transmission schedule is not implemented, there may occur such a situation that the base station apparatus is incapable of transmitting a presidential message in spite of being capable of transmitting a message related to an advertisement of a commercial product.

In either case, the terminal apparatus is incapable of receiving a message and incapable of obtaining the information of a message content.

SUMMARY

According to an aspect of the embodiments, a base station apparatus that divides a message into a data of a transmittable size to a terminal apparatus, and transmits the divided data to subordinate all the terminal apparatuses by broadcast, the base station apparatus including: a radio utilization rate calculation unit configured to calculate a radio utilization rate indicating a rate of a time for transmission of one of the message with respect to a transmission period of each the message in case of transmitting the message repetitively, based on a number of repetition times of each the divided data and a transmission period of each the divided data; and a transmission decision unit configured to determine a transmission schedule of the data based on the radio utilization rate.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10A to 10D are diagrams for explaining a radio utilization rate, and FIG. 10E is a diagram illustrating an example of a radio utilization rate stored in a data storage unit.

FIGS. 13A to 13E are diagrams for explaining a CMAS transmission capability or incapability decision function.

FIG. 16A is a diagram illustrating examples of parameters included in a WRITE-REPLACE WARNING REQUEST, and FIG. 16B is a diagram illustrating examples of parameters included in an SIB10, respectively.

FIGS. 17A and 17B are diagrams illustrating examples of parameters included in an SIB11, an SIB12, respectively.

FIG. 18 is a diagram illustrating an example of SchedulingInfo included in an SIB1.

DESCRIPTION OF EMBODIMENTS

Hereafter, the present embodiments will be described in detail by reference to the drawings.

First Embodiment

Figure 1:
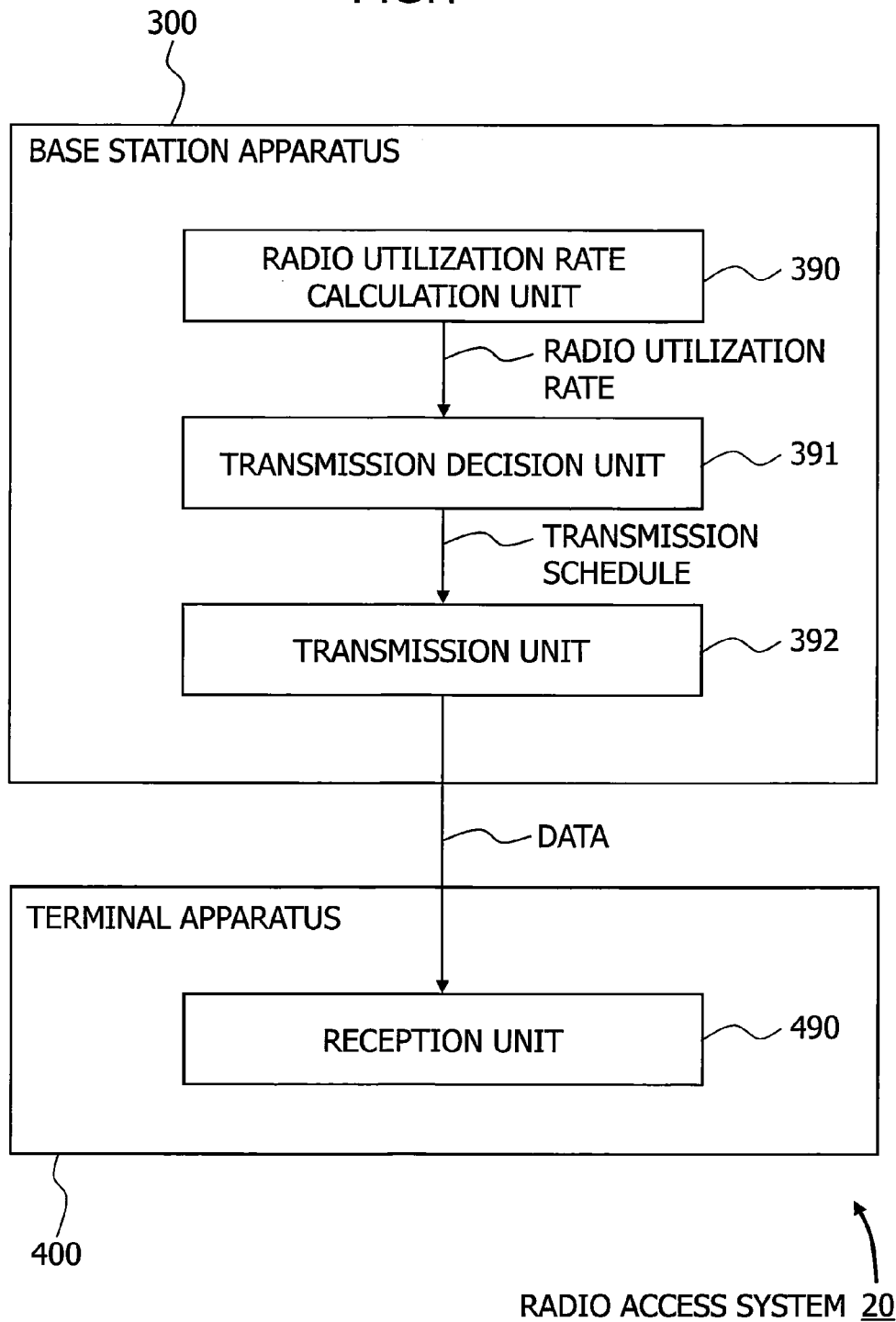
FIG. 1 is a diagram illustrating a configuration example of a radio access system.

FIG. 1 is a diagram illustrating a configuration example of a radio access system 20 according to a first embodiment. The radio access system 20 includes a base station apparatus 300 and a terminal apparatus 400.

The base station apparatus 300 performs radio communication with the terminal apparatus 400 in the coverage range of the self-station, so that can provide a variety of services to the terminal apparatus 400. Further, the terminal apparatus 400 is a smartphone, a feature phone, a tablet, a personal computer, etc., and can perform radio communication with the base station apparatus 300 in the coverage range of the base station apparatus 300.

The base station apparatus 300 divides a message into data of a size that can be transmitted to the terminal apparatus 400, and transmits the divided data to all subordinate terminal apparatuses 400 in broadcast.

The base station apparatus 300 includes a radio utilization rate calculation unit 390, a transmission decision unit 391 and a transmission unit 392. Also, the terminal apparatus 400 includes a reception unit 490.

The radio utilization rate calculation unit 390 calculates a radio utilization rate which indicates the ratio of a time needed to transmit one message with respect to the transmission period of each message when the message is transmitted in repetition, on the basis of the number of repetition times of each divided data and the transmission period of each data.

The transmission decision unit 391 determines the transmission schedule of data on the basis of the radio utilization rate.

The transmission unit 392 transmits data to the terminal apparatus 400 according to the determined transmission schedule.

The reception unit 490 in the terminal apparatus 400 receives data transmitted from the base station apparatus 300.

As such, in the present first embodiment, the base station apparatus 300 is configured to divide a message into data and determine the transmission schedule of the divided data, on the basis of the radio utilization rate. In this case, the radio utilization rate indicates the ratio of a time needed to transmit one message with respect to a message transmission period, for example.

Accordingly, the base station apparatus 300 can transmit the data in repetition within the message transmission period, and also can determine a transmission schedule so that can transmit all of each data in the message.

Therefore, for example, without an inefficient data transmission schedule such as an exceeding transmission period of a message, it is possible to efficiently perform message transmission of all data related to the message within the message transmission period.

Further, for example, even in the case of simultaneously transmitting a plurality of messages, it is possible to schedule at the transmission of a message in a manner to transmit all data of the message within the transmission period of the message, with the transmission of another message. Therefore, in this case also, efficient message transmission becomes possible.

Additionally, as an example of the message, there is a message related to the CMAS, and as an example of data, there is an SIB12 or the like. In this case, the radio access system 20 is applied in a CMAS distribution system.

Second Embodiment

Next, a second embodiment will be described. In the second embodiment, the description will be given in the following order.

<1. A configuration example of the information distribution system>
<2. Configuration examples of the Warning Server and the MME>
<3. A configuration example of the base station>
<4. A configuration example of the terminal>
<5. Regarding EDF scheduling>
<6. Regarding Iteration Number>
<7. Operation examples>

1. A Configuration Example of the Information Distribution System

Figure 2:
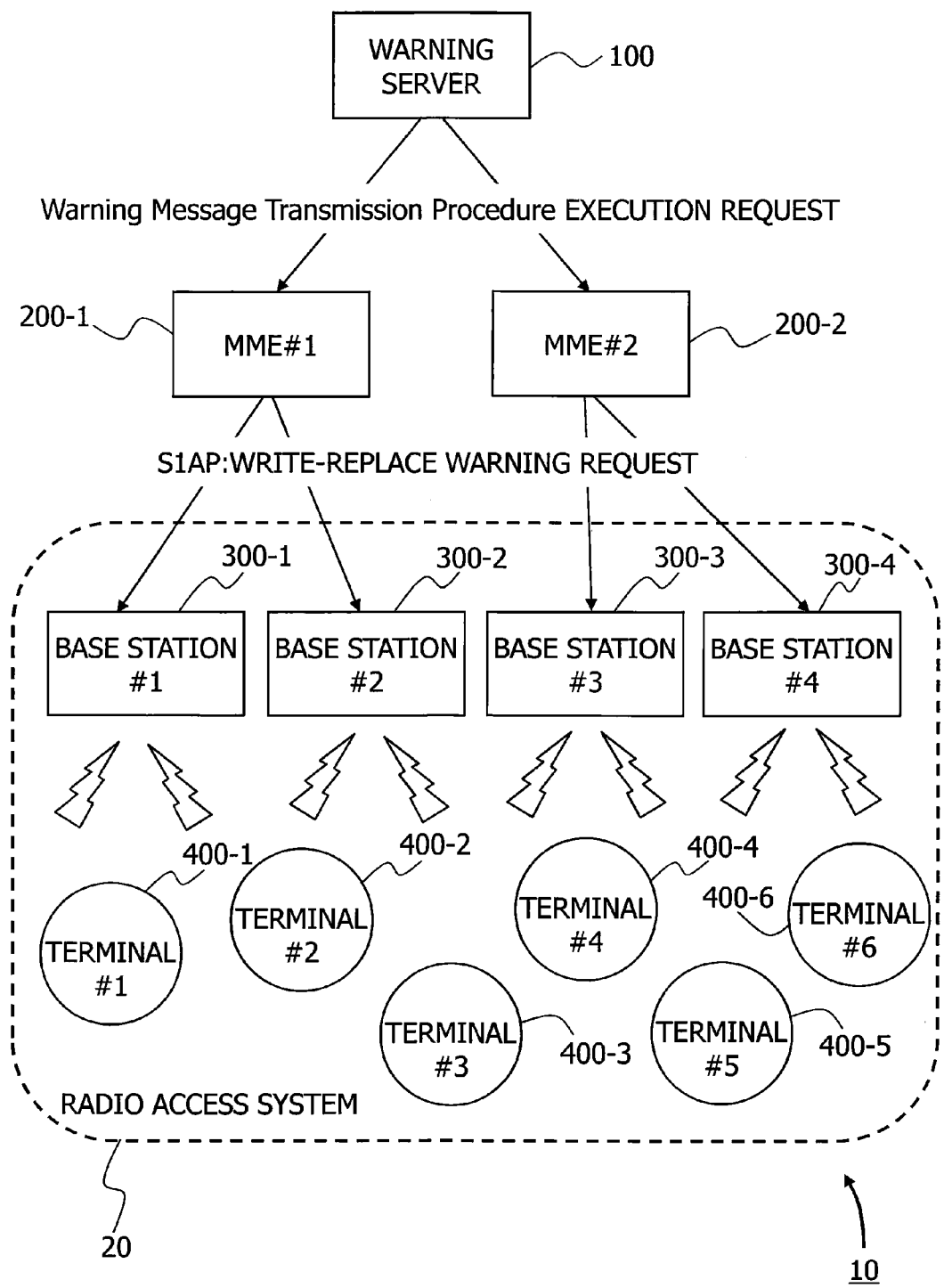
FIG. 2 is a diagram illustrating a configuration example of an information distribution system

A description will be given on a configuration example of the information distribution system. FIG. 2 is a diagram illustrating a configuration example of an information distribution system 10.

The information distribution system 10 is, for example, a CMAS (Commercial Mobile Alert System) or the like, and is a system which distributes a message to terminal apparatuses (which may hereafter be referred to as "terminals") 400-1 to 400-6. The message includes, for example, a presidential message, an alert related to a threat to the safety of life, an advertisement of a commercial product, etc. The information distribution system 10 can simultaneously distribute a plurality of types of messages to the terminals 400-1 to 400-6, for example.

The information distribution system 10 includes a Warning Server 100, MME (Mobile Management Entities) 200-1, 200-2, base station apparatuses (which may hereafter be referred to as "base stations") 300-1 to 300-4 and the terminals 400-1 to 400-6.

The Warning Server 100 transmits a "Warning Message Transmission Procedure execution request" message to the MME 200-1, 200-2.

The MME 200-1, 200-2 execute, for example, bearer setting, authentication, control related to security, etc. In the present second embodiment, the MME 200-1, 200-2, on receiving the "Warning Message Transmission Procedure execution request" message from the Warning Server 100, generate "WRITE-REPLACE WARNING REQUEST" (which may hereafter be referred to as "S1AP: WRITE-REPLACE WARNING REQUEST") messages specified in an S1AP Application Protocol Message (which may hereafter be referred to as "S1AP message"). The MME 200-1, 200-2 transmit the generated "S1AP: WRITE-REPLACE WARNING REQUEST" to the subordinate base stations 300-1 to 300-4. Parameters included in the "S1AP: WRITE-REPLACE WARNING REQUEST" are depicted in FIG. 16A, for example.

The base stations 300-1 to 300-4 perform radio communication with the terminals 400-1 to 400-6 in the coverage area of the self-stations, to provide a variety of services, such as a speech communication service and a video distribution service, for the terminals 400-1 to 400-6. In the present second embodiment, the base stations 300-1 to 300-4, on receiving the "S1AP: WRITE-REPLACE WARNING REQUEST" from the MME 200-1, 200-2, transmit a message content included in the "S1AP: WRITE-REPLACE WARNING REQUEST" to all subordinate terminals 400-1 to 400-6.

In this case, the base stations 300-1 to 300-4 distribute the message content using an SIB (System Information Block type)-12. Parameters included in the SIB12 are depicted in FIG. 17B, for example.

Additionally, the base stations 300-1 to 300-4 distribute an SIB1 including "SchedulingInfo" to all subordinate terminals 400-1 to 400-6. The "SchedulingInfo" includes, for example, an SIB12 transmission period as depicted in FIG. 18. The terminals 400-1 to 400-6 can wait for the transmission of the SIB12 according to the SIB12 transmission period which is included in the "SchedulingInfo".

The terminals 400-1 to 400-6 perform radio communication with each base station 300-1 to 300-4 in the coverage area of each base station 300-1 to 300-4. The terminals 400-1 to 400-6, on receiving the distribution of the SIB12 from each base station 300-1 to 300-6, unify message contents divided into segments, so that can receive the message content related to the CMAS.

Additionally, in the information distribution system 10, for example, a radio access system 20 is included. The radio access system 20 includes, for example, the base stations 300-1 to 300-4 and the terminals 400-1 to 400-6.

Although there is illustrated, in the example of FIG. 2, an example in which the Warning Server 100 is connected to two MME 200-1, 200-2, the number of connected MME may be one, or three or more. Also, although there is illustrated in the example of FIG. 2 an example in which the MME 200-1 is connected to two base stations 300-1 to 300-2, the number of connected base stations may be one or three or more. The same is applied to the MME 200-2. Also, the number of connections of the terminals 400-1 to 400-6 in each base station 300-1 to 300-4 may be one or plural.

Here, the MME 200-1, 200-2 are of the same configuration, so that there may be a case of being referred to as an MME 200, for example. Also, the base stations 300-1 to 300-4 are of the same configuration, so that there may be a case of being referred to as a base station 300, for example. Further, the terminals 400-1 to 400-6 are of the same configuration, so that there may be a case of being referred to as a terminal 400, for example.

Further, as the information distribution system 10, an information distribution system other than the CMAS is applicable as long as the system can perform message distribution, for example.

Hereinafter, a configuration example of each apparatus included in the information distribution system 10 will be described.

2. Configuration Examples of the Warning Server and the MME

Figure 3:
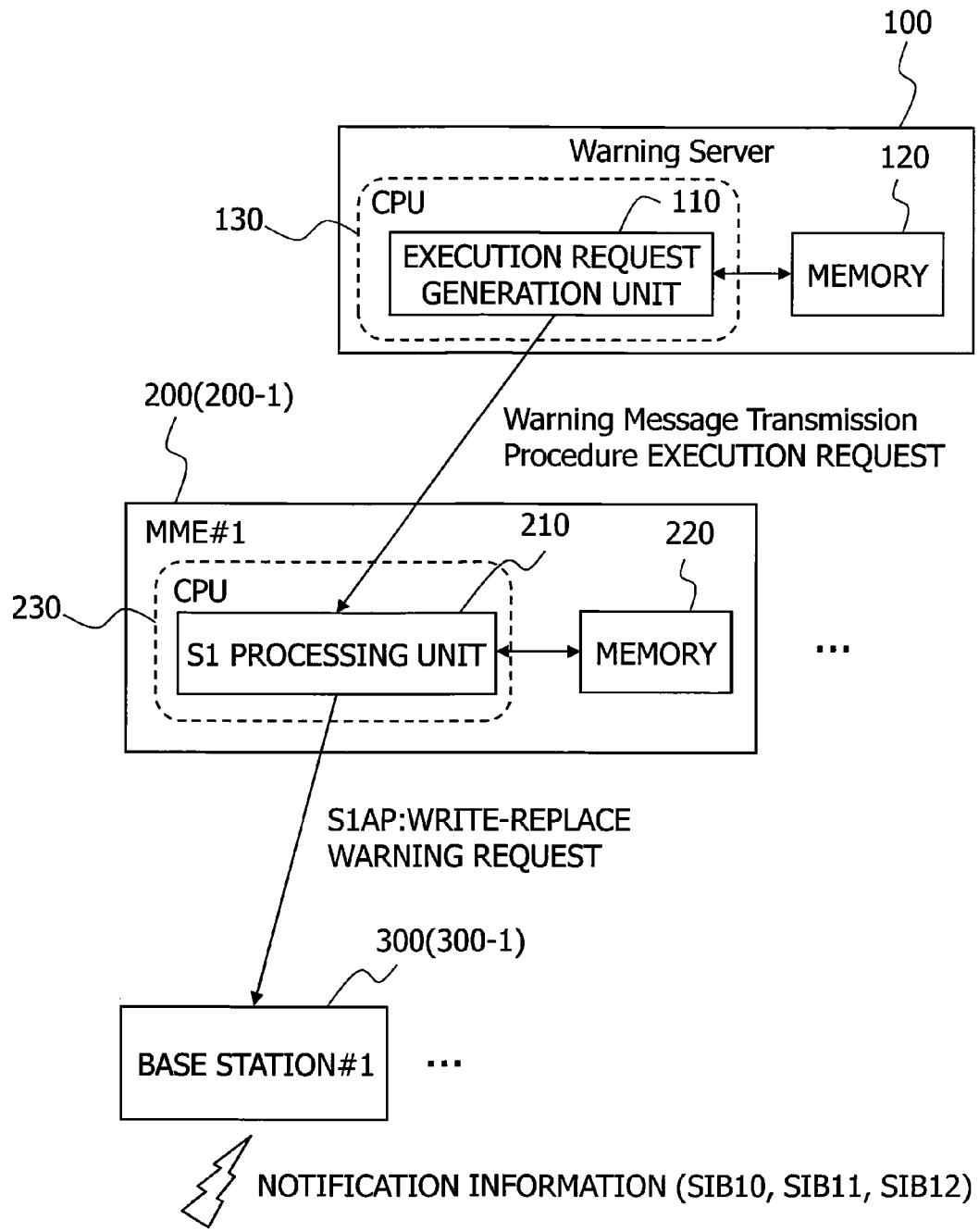
FIG. 3 is a diagram illustrating configuration examples of a Warning Server and an MME.

FIG. 3 is a diagram illustrating configuration examples of the Warning Server 100 and the MME 200.

The Warning Server 100 includes an execution request generation unit 110 and a memory 120. The execution request generation unit 110 generates a "Warning Message Transmission Procedure execution request" message to transmit to the MME 200-1. The memory 120 stores each parameter etc. included in the "Warning Message Transmission Procedure execution request" message.

For example, the execution request generation unit 110 reads out from the memory 120 each parameter through an operation of the Warning Server 100 by an operator, to generate and transmit the "Warning Message Transmission Procedure execution request" message.

Here, the Warning Server 100 includes, for example, a CPU (Central Processing Unit) 130 and the memory 120, as a hardware configuration. The CPU 130 corresponds to, for example, the execution request generation unit 110.

The MME 200 includes an S1 processing unit 210 and a memory 220. The S1 processing unit 210 performs processing related to the transmission and the reception of an S1AP message.

The S1 processing unit 210 performs, for example, the following processing. Namely, the S1 processing unit 210, on receiving the "Warning Message Transmission Procedure execution request" message from the Warning Server 100, extracts each parameter included in the message concerned. Then, the S1 processing unit 210 generates a "S1AP: WRITE-REPLACE WARNING REQUEST" which includes the extracted parameter. The S1 processing unit 210 transmits the generated "S1AP: WRITE-REPLACE WARNING REQUEST" to the base station 300.

The memory 220 functions as a work area when processing is performed in the S1 processing unit 210, for example. The memory 220 may include each parameter etc. included in the "S1AP: WRITE-REPLACE WARNING REQUEST", for example. In this case, the parameter stored in the memory 220 is appropriately read out by the S1 processing unit 210, so that the "S1AP: WRITE-REPLACE WARNING REQUEST" is generated.

Also, the MME 200 includes, for example, a CPU 230 and the memory 220 as a hardware configuration. The CPU 230 corresponds to, for example, the S1 processing unit 210.

3. A Configuration Example of the Base Station

Figure 4:
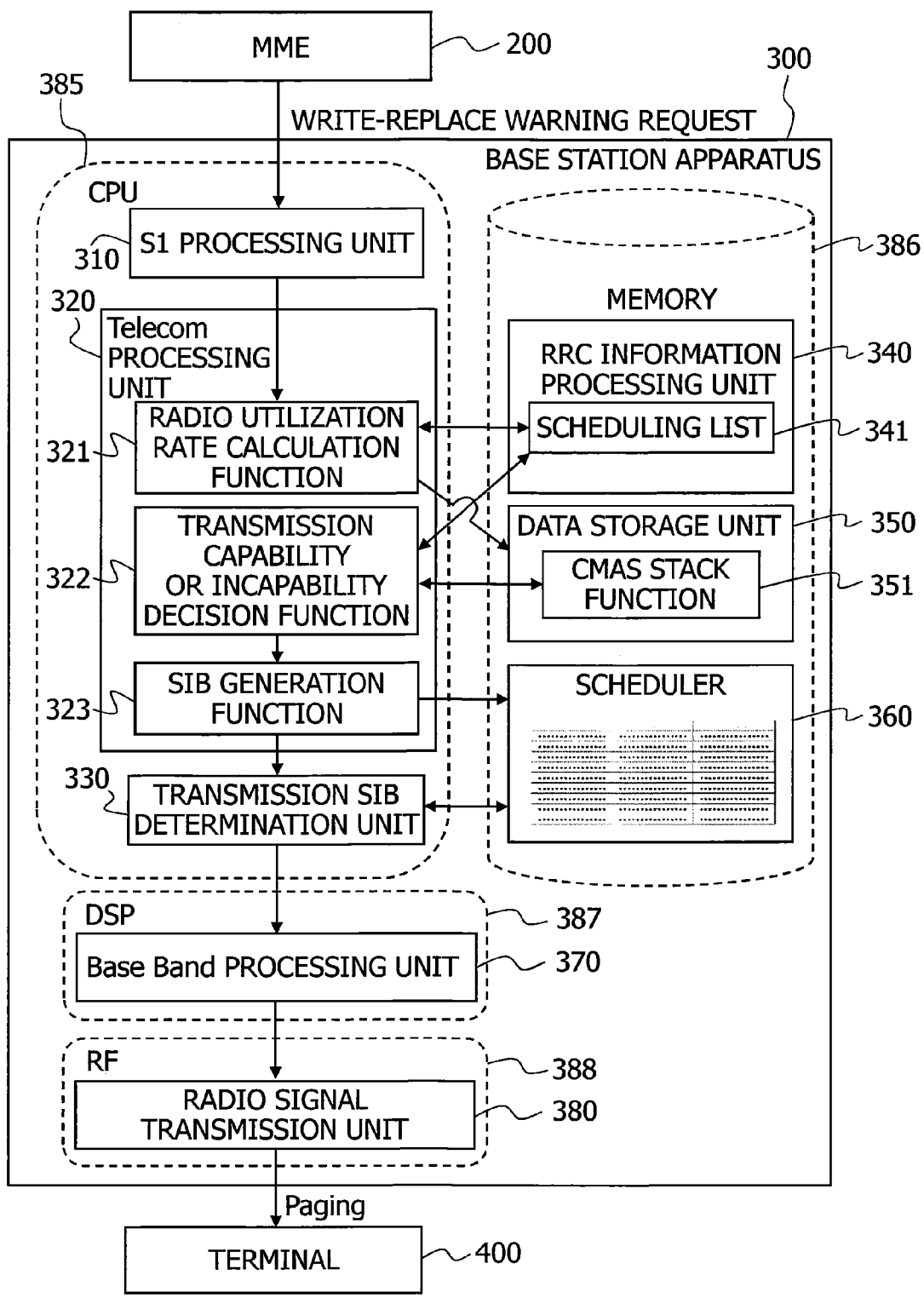
FIG. 4 is a diagram illustrating a configuration example of a base station apparatus.

FIG. 4 is a diagram illustrating a configuration example of the base station 300. The base station 300 includes an S1 processing unit 310, a Telecom processing unit 320, a transmission SIB determination unit 330, an RRC (Radio Resource Control) information processing unit 340, a data storage unit 350, a SCHEDULER 360, a baseband processing unit 370 and a radio signal transmission unit 380.

The S1 processing unit 310 performs processing related to the transmission and the reception of an S1AP message. For example, the S1 processing unit 310 performs processing as follows.

Namely, the S1 processing unit 310, on receiving the "S1AP: WRITE-REPLACE WARNING REQUEST" transmitted from the MME 200, confirms whether or not a "warning type" is included in the received message. If the "warning type" is included in the received message, the S1 processing unit 310 discriminates that the message is a message from the ETWS. Also, if the "warning type" is not included in the message, the S1 processing unit 310 discriminates that the message is a message from the CMAS. In this case, the S1 processing unit 310 outputs the received "S1AP: WRITE-REPLACE WARNING REQUEST" to the Telecom processing unit 320.

Additionally, in the followings, the "S1AP: WRITE-REPLACE WARNING REQUEST" which does not include the "warning type" may be referred to as a CMAS message. Further, in the "S1AP: WRITE-REPLACE WARNING REQUEST" which does not include the "warning type", a message which is included in "warning Message Contents" may also be referred to as a CMAS message.

The Telecom processing unit 320 performs call connection processing, call communication processing, etc. Further, the Telecom processing unit 320 includes a radio utilization rate calculation function (or radio utilization rate calculation unit) 321, a transmission capability or incapability decision function (or transmission decision unit) 322 and an SIB generation function (or SIB generation unit) 323. The above functions in the Telecom processing unit 320 are functions to be executed in the Telecom processing unit 320, for example. Although the entity of execution of the above functions is the Telecom processing unit 320, for example, the following description is made on the assumption that each function 321-323 executes the functions, by taking differences among the functions etc. into consideration.

Here, the radio utilization rate calculation unit 390 in the first embodiment corresponds to the radio utilization rate calculation function 321, for example. Also, the transmission decision unit 391 in the first embodiment corresponds to the transmission capability or incapability decision function 322, for example. Further, the transmission unit 392 in the first embodiment corresponds to the transmission SIB determination unit 330, the baseband processing unit 370 and the radio signal transmission unit 380, for example.

The radio utilization rate calculation function 321 calculates a CMAS radio utilization rate on the received CMAS message. The detail of the CMAS radio utilization rate will be described later. The radio utilization rate calculation function 321 calculates each CMAS radio utilization rate on the basis of each SCHEDULER which is included in a scheduling list stored in the RRC information processing unit 340. The radio utilization rate calculation function 321 stores the calculated CMAS radio utilization rate and each parameter included in the received CMAS message into the data storage unit 350.

Here, the SCHEDULER signifies an SIB transmission method which is defined or specified by "SchedulingInfo", for example. The "SchedulingInfo" is, for example, information included in an SIB1 to specify the SIB transmission method concerning an SIB3 and thereafter. An example of the "SchedulingInfo" is depicted in FIG. 18. The detail of the SCHEDULER will also be described later.

The transmission capability or incapability decision function 322 decides the transmission capability or incapability of a CMAS message on the basis of a CMAS radio utilization rate and the total value of CMAS radio utilization rates at that time point. By the decision of the transmission capability or incapability, the transmission capability or incapability decision function 322 determines which SCHEDULER is to be used to transmit the CMAS message through an SIB12, to output information related to the determined SCHEDULER to the SIB generation function 323. Further, the transmission capability or incapability decision function 322 also reads out each parameter of the CMAS message stored in the data storage unit 350, so as to output to the SIB generation function 323. The detail of transmission capability or incapability decision will be described later.

The SIB generation function 323 stores the SCHEDULER received from the transmission capability or incapability decision function 322 into a memory 386. The SCHEDULER stored in the memory 386 comes to a SCHEDULER 360, for example. Also, the SIB generation function 323 generates an SIB12 for the CMAS message received from the transmission capability or incapability decision function 322, for example. The SIB generation function 323 outputs the generated SIB12 to the transmission SIB determination unit 330 and the SCHEDULER 360. Further, the SIB generation function 323 also outputs each parameter of the CMAS message received from the transmission capability or incapability decision function 322, for example, to the SCHEDULER 360 and the transmission SIB determination unit 330.

The transmission SIB determination unit 330 executes a transmission SIB determination function. By the transmission SIB determination function, an SIB12 sequence to be transmitted to the terminal 400 is determined, so that the SIB12 is output to the baseband processing unit 370 according to the sequence. In this case, the transmission SIB determination unit 330 determines the transmission schedule of the SIB12 according to an EDF scheduling, for example. The details of the transmission SIB determination function and the EDF scheduling will be described later.

The RRC information processing unit 340 performs processing related to an RRC message, for example. In the present second embodiment, the RRC information processing unit 340 stores a scheduling list 341. The scheduling list 341 includes one or a plurality of SCHEDULER. The scheduling list 341 is stored when the base station 300 is installed, for example.

Figure 7:
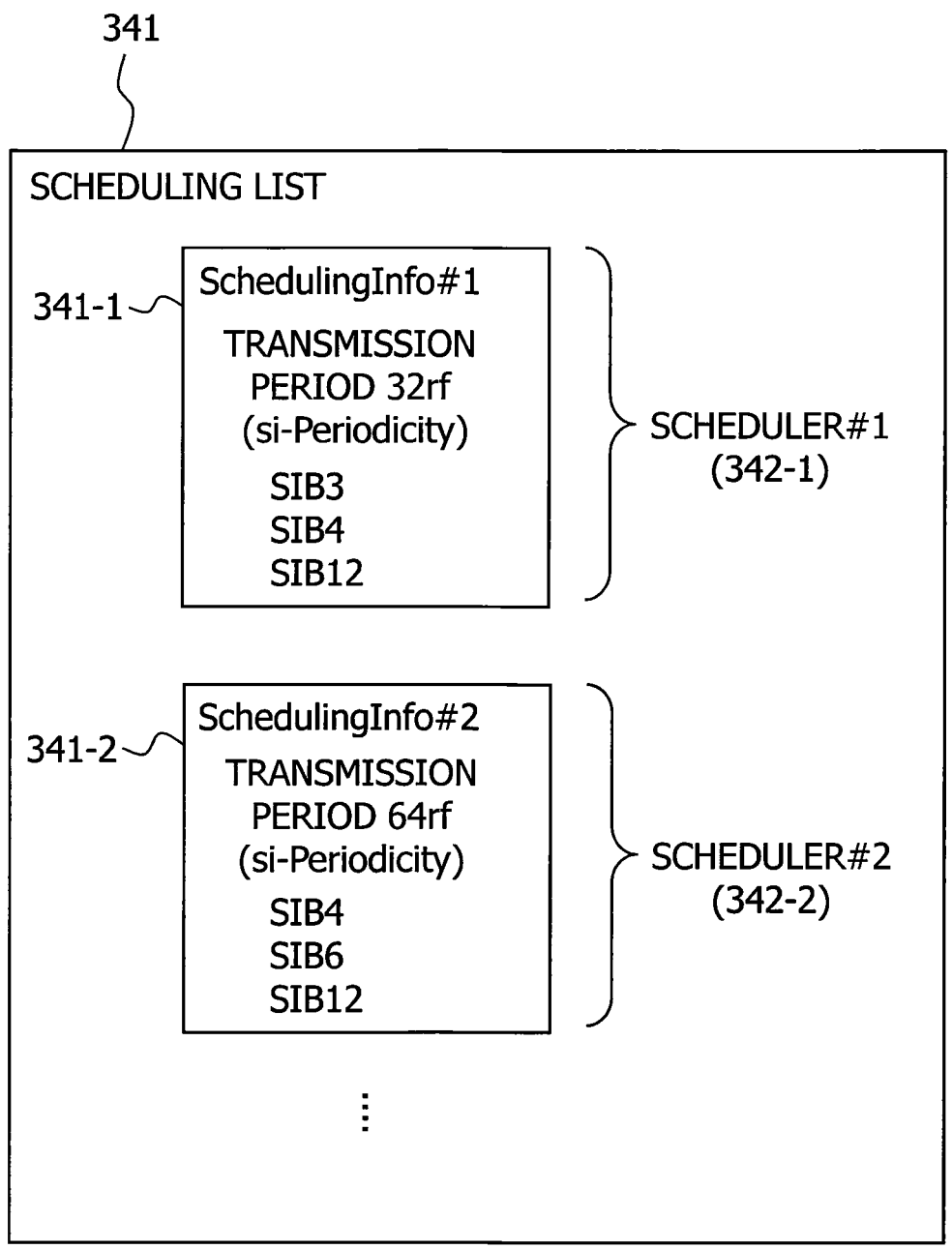
FIG. 7 is a diagram illustrating an example of a scheduling list.

FIG. 7 illustrates an example of the scheduling list 341. The scheduling list 341 includes one or a plurality of "SchedulingInfo". The "SchedulingInfo" specifies or defines the transmission schedule of each SIB, for example, and typically, there is specified or defined a transmission period in which each SIB is transmitted. As described above, the SCHEDULER is specified by the "SchedulingInfo", for example.

For example, in "SchedulingInfo#1 (341-1)", there are specified "SIB3", "SIB4" and "SIB12" to be transmitted in a transmission period of "32 rf (radio frames)". Also, "SIB4", "SIB6" and "SIB12" to be transmitted in a transmission period of "64 rf" are specified in "SchedulingInfo#2 (342-1)".

For example, the "SchedulingInfo#1 (341-1)" corresponds to SCHEDULER#1 (342-1) and the "SchedulingInfo#2 (341-2)" corresponds to SCHEDULER#2 (342-2), respectively.

Here, a SCHEDULER defined in j-th SchedulingInfo may be referred to as SCHEDULER$^j$, for example.

Referring back to FIG. 4, the data storage unit 350 stores CMAS radio utilization rates, CMAS message parameters, etc. Further, the data storage unit 350 includes a CMAS stack function 351. By the CMAS stack function 351, it is possible to set priority for each CMAS message by the CMAS stack function 351, for example.

The SCHEDULER 360 is, for example, a SCHEDULER which is selected by the transmission capability or incapability decision function 322 and stored in the memory 386, so as to manage the transmission schedule of each SIB.

The baseband processing unit 370 performs, for example, error correction coding processing and modulation processing on a transmission SIB which is output from the transmission SIB determination unit 330, to convert into a baseband signal. The baseband processing unit 370 outputs the converted baseband signal to the radio signal transmission unit 380. To enable such processing, the baseband processing unit 370 may internally include an error correction coding circuit, a modulation circuit, etc.

The radio signal transmission unit 380 converts (upconverts) the baseband signal which is output from the baseband processing unit 370 into a radio signal of a radio band. The radio signal transmission unit 380 transmits the converted radio signal to the terminal 400. To enable such conversion, the radio signal transmission unit 380 may internally include a frequency conversion circuit, a D/A (Digital to Analogue) conversion circuit, etc. The radio signal transmission unit 380 transmits, for example, a "Paging" message to the terminal 400, to notify the terminal 400 in a waiting state of the incoming of an SIB. The "Paging" message is generated, for example, in the Telecom processing unit 320, etc.

Additionally, as hardware, the base station 300 may include a CPU (Central Processing Unit) 385, a memory 386, a DSP (Digital Signal Processor) 387 and an RF (Radio Frequency) 388. The CPU 385 corresponds to the S1 processing unit 310, the Telecom processing unit 320 and the transmission SIB determination unit 330, for example. Also, the memory 386 corresponds to the RRC information processing unit 340, the data storage unit 350 and the SCHEDULER 360, for example. Further, the DSP 387 corresponds to the baseband processing unit 370, for example. Further, the RF 388 corresponds to the radio signal transmission unit 380, for example.

The CPU 385 reads out a program stored in the memory 386 to execute the program, for example, so that can achieve the functions performed in the S1 processing unit 310, the Telecom processing unit 320 and the transmission SIB determination unit 330.

4. A Configuration Example of the Terminal

Figure 5:
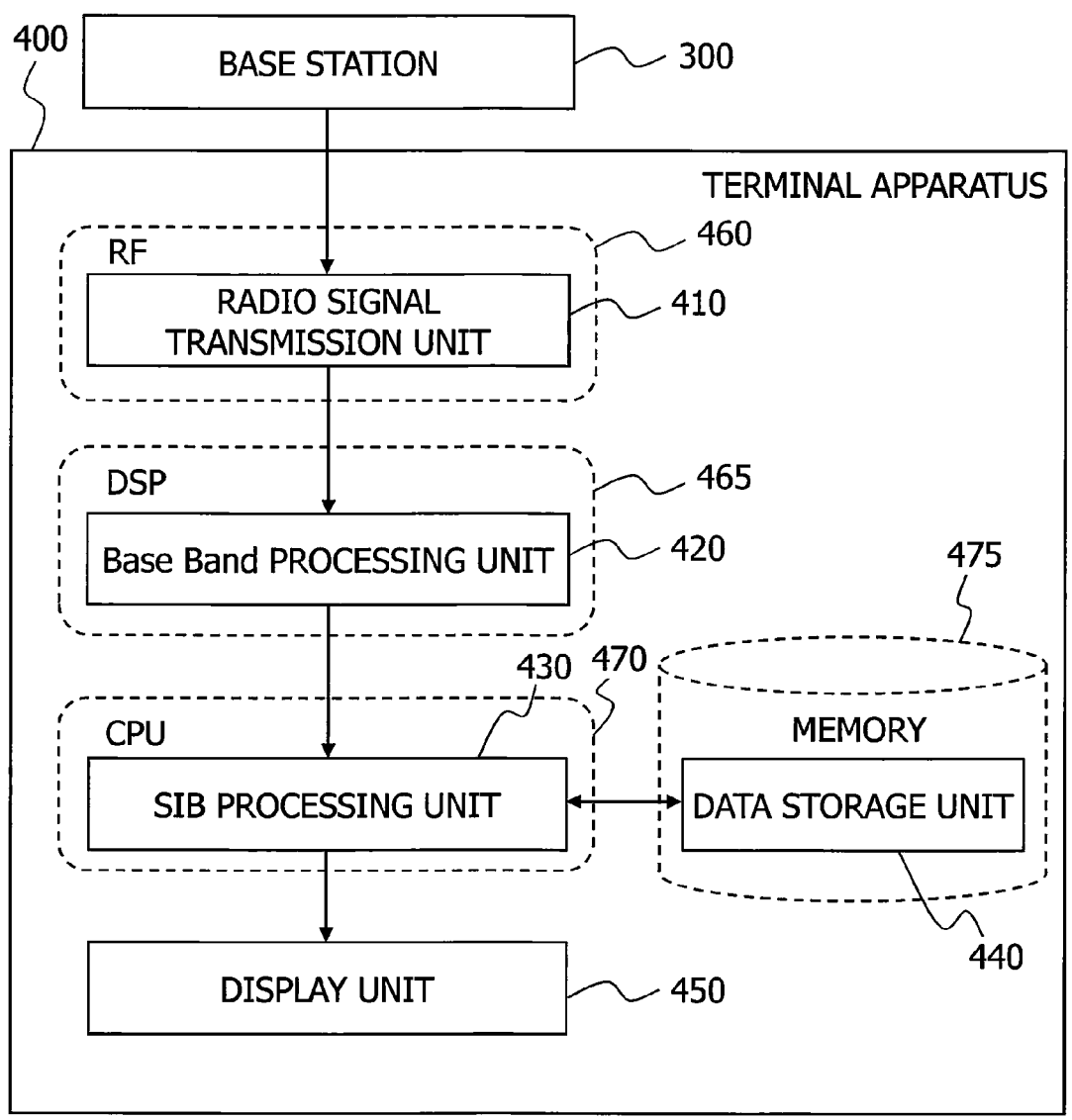
FIG. 5 is a diagram illustrating a configuration example of a terminal apparatus.

FIG. 5 is a diagram illustrating a configuration example of the terminal 400. The terminal 400 includes a radio signal transmission unit 410, a baseband processing unit 420, an SIB processing unit 430, a data storage unit 440 and a display unit 450.

Here, the reception unit 490 in the first embodiment corresponds to the radio signal transmission unit 410, the baseband processing unit 420 and the SIB processing unit 430, for example.

The radio signal transmission unit 410 receives a radio signal transmitted from the base station 300, and converts (downconverts) the radio signal into a baseband signal. To enable such frequency conversion processing, the radio signal transmission unit 410 may internally include a frequency conversion circuit.

The baseband processing unit 420 performs demodulation processing, error correction decoding processing etc. on the baseband signal output from the radio signal transmission unit 410, to extract an SIB which is transmitted from the base station 300. To enable such processing, the baseband processing unit 420 may internally include a demodulation circuit, an error correction decoding circuit, etc.

The SIB processing unit 430 reproduces a message from an SIB12 which is output from the baseband processing unit 420 on the basis of each parameter included in the SIB12. For example, the SIB processing unit 430 unifies each segment on the basis of "warningMessageSegmentType", "warningMessageSegmentNumber" and "warningMessageSegment", so as to reproduce a message content. In this case, the SIB processing unit 430 appropriately accesses the data storage unit 440 to store the parameter etc. included in the SIB12.

Also, the SIB processing unit 430, on receiving an SIB1, stores information related to the "SchedulingInfo" included in the SIB1 into the data storage unit 440. In this case, the SIB processing unit 430 instructs the radio signal transmission unit 410 etc. to receive the SIB12 in the period of "si-Periodicity" included in the "SchedulingInfo".

The data storage unit 440 stores, for example, the parameter of each SIB. Also, the data storage unit 440 functions as a work area when the SIB processing unit 430 unifies each segment to reproduce the message content.

According to an instruction from the SIB processing unit 430, the display unit 450 displays the message content included in the SIB12 output from the SIB processing unit 430, for example.

As a hardware configuration, the terminal 400 may include the display unit 450, a RF 460, a DSP 465, a CPU 470 and a memory 475. In this case, the RF 460 corresponds to the radio signal transmission unit 410, for example. The DSP 465 corresponds to the baseband processing unit 420, for example. Also, the CPU 470 corresponds to the SIB processing unit 430, for example. Further, the memory 475 corresponds to the data storage unit 440, for example.

5. Regarding EDF Scheduling

Next, EDF (Earliest Deadline First) scheduling will be described. In the present second embodiment, the base station 300 transmits an SIB12 using the EDF scheduling.

The EDF scheduling is, for example, a scheduling method to enable the processor to perform processing without generating a deadline miss if a predetermined condition is satisfied, when the processing is performed in a real time OS (Operating System) by a single processor.

Here, a deadline signifies, for example, a time which causes an error if processing is not completed within the time concerned. In the following, a description is given on the assumption that a deadline to complete the task of concern is identical to a period in which the task occurs next.

In the EDF scheduling, for example, the following decision is made on a unit time basis (for example, second or millisecond).

1) When there is no task which is currently in execution at decision timing, there is executed, among tasks of which execution is requested, a task which is nearest to the deadline is executed, whereas other tasks are deferred to the next decision timing.

2) When there is a task which is in execution at decision timing, and if, among tasks of which execution is requested, there are other tasks nearer to the deadline than the task currently in execution, the task currently in execution is interrupted, so that another task nearest to the deadline is executed.

It can be considered from the above that, in the EDF scheduling, scheduling is made in such a manner that priority is given to a task nearer to the deadline, with the permission of interruption processing by a task which is generated later, for example.

For example, let a time needed for one time of processing of each task be $C_i$, the period of each task be $T_i$, and a CPU utilization rate of each task be $U_i=C_i/T_i$, then, as long as $$\Sigma U_i = C_i/T_i \leq 1 \qquad \text{[Expression 1]}$$

is satisfied, task processing using the EDF scheduling can be scheduled without an error.

Figure 6:
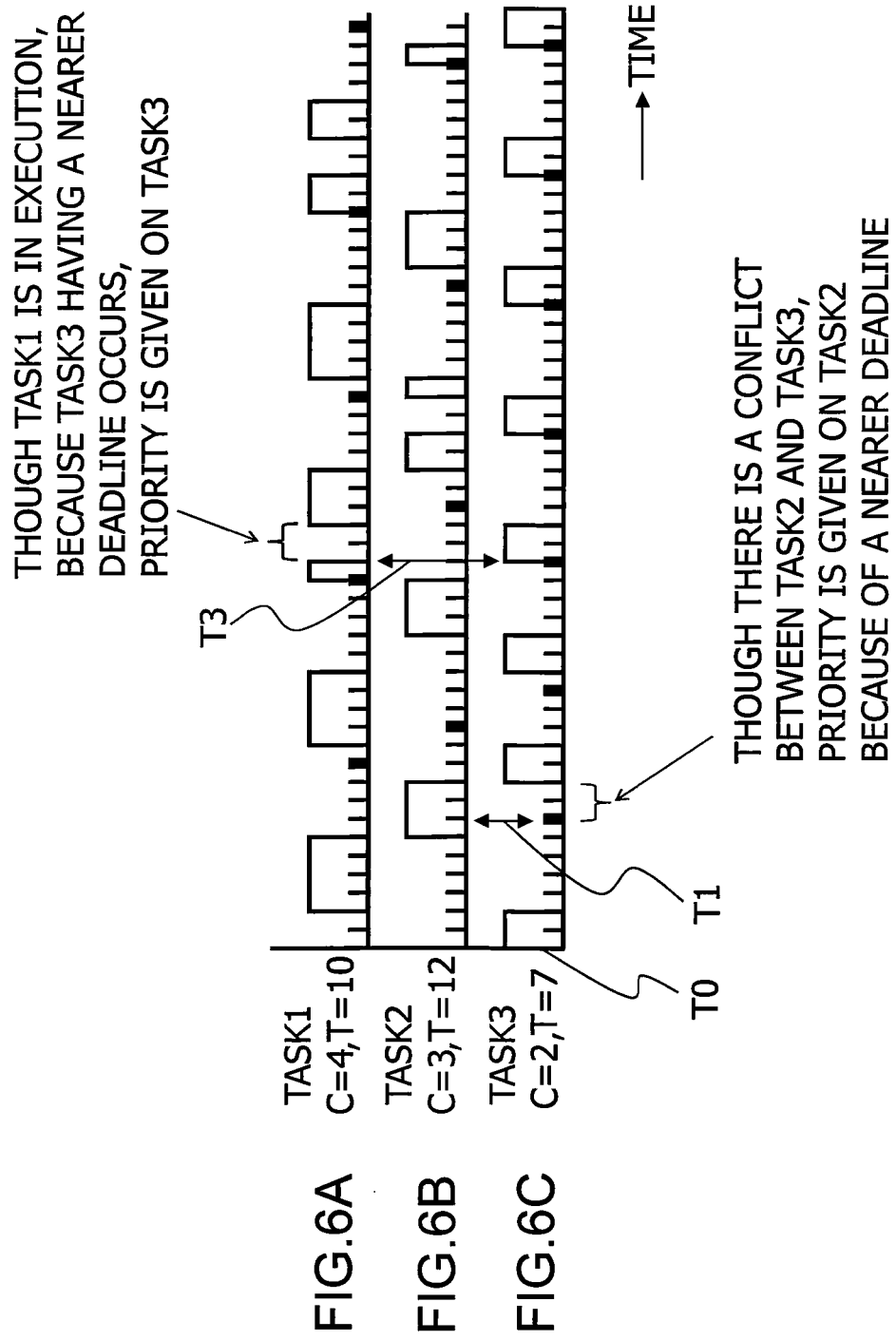
FIGS. 6A to 6C are diagrams illustrating an example of task processing by EDF scheduling.

FIGS. 6A to 6C are diagrams illustrating an example of task processing according to the EDF scheduling. The horizontal axis denotes the time, and a unit scale in the horizontal axis direction denotes a unit time. Also, a scale depicted with a bold line denotes a period time of each task. For example, as depicted in FIG. 6A, a time C consumed for the one-time processing of a task1 is "4", and a period T of the task1 is "10", so that each scale with the bold line is depicted every "10" unit times.

For example, when execution is requested for the task1 to a task3 at time T0, by the above-mentioned 1) of the EDF scheduling, the task3 which is nearest to a deadline (or period) from T0 is executed first. After the lapse of "1" unit time after the start of execution of the task3, because there is nothing that satisfies the above-mentioned 2), the execution of the task3 is continued.

On completion of the execution of the task3, next, either the task1 or a task2 is to be executed, and because the task1 is nearer to the deadline than the task2, the task1 is executed.

At time T1, the task2 is executed, and because the execution of the task3 can be started because the periodic time of the task3 is completed, the task2 conflicts with the task3. In this case, because the task2 is nearer to the deadline than the task3, priority is given to the task2, so that the execution of the task2 is continued intact.

At time T3, the execution of the task1 is in the halfway and the start time of the task3 arrives, and therefore the task1 conflicts with the task3. In this case, because the deadline of the task3 is nearer to the deadline of the task1, the processing of the task1 is once completed halfway, and the task3 is executed preferentially (in interruption).

According to the present second embodiment, the EDF scheduling is also applied to the transmission schedule of the SIB12. The typical example thereof will be described later.

6. Regarding Iteration Number

Next, a description will be given on an Iteration Number. As described earlier, the base station 300 divides a message content into each segment to transmit an SIB12 which includes the segment, for example. This causes the message content to be divided into each size which can be transmitted in a radio section, for example, so that the message content can be transmitted in the radio section concerned. Here, the segment signifies, for example, each divided message content.

Figure 8:
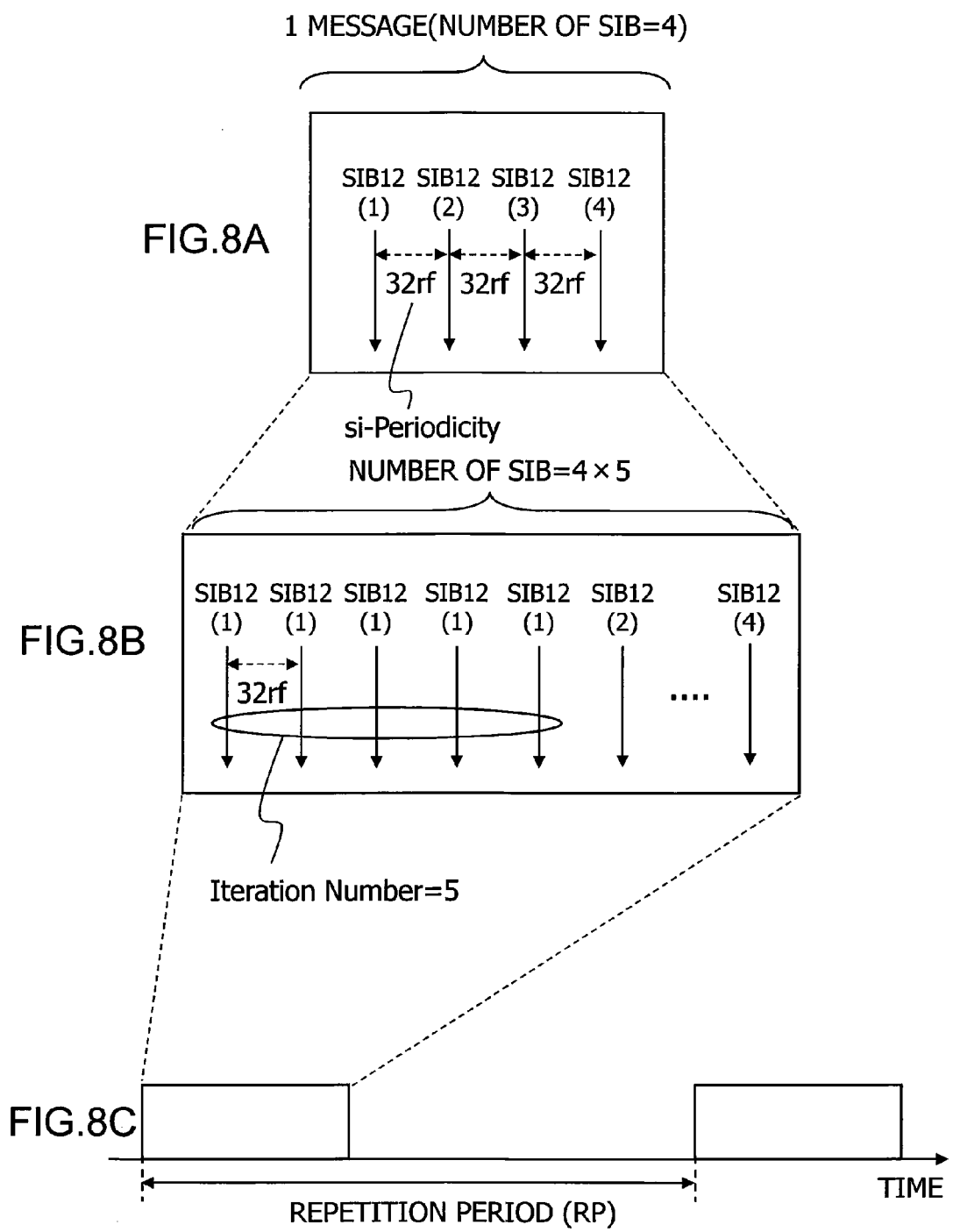
FIGS. 8A to 8C are diagrams illustrating examples of si-Periodicity, Iteration Number and Repetition Period, respectively.

FIG. 8A illustrates an example when one message is transmitted after divided into four segments. The segments divided into four are transmitted through four SIB12 (SIB12 (1) to SIB12 (4)). Further, each SIB12 is transmitted at every transmission period (for example, "32 rf") which is specified by "si-Periodicity".

As such, the message content is transmitted from the base station 300 to the terminal 400 after divided into each segment. In this case, it hardly occurs in actual implementation that the base station 300 transmits the SIB12 of the same content only once, whereas a plurality of times of repeated transmission may occur. In the case of the repeated transmission of the SIB12 of the same content, the minimum number of times of transmission that has to be made may be referred to as a minIterationNumber, for example. Also, in the case of repeated transmission of the SIB of the same content, the number of times of transmission that is not to be made more may be referred to as a maxIterationNumber, for example. The applicable number of times of repetition between the two values of the minIterationNumber and the maxIterationNumber may be referred to as an IterationNumber, for example. By the repeated transmission of an identical SIB, the possibility of reception by the terminal 400 increases, as compared to a case of only one-time SIB transmission, for example.

Additionally, the minIterationNumber and the maxIterationNumber may be different SCHEDULER-by-SCHEDULER, for example.

Further, the number of times of repetition of a message content is specified by a "Number of Broadcasts Requested" which is included in an "S1AP: WRITE-REPLACE WARNING REQUEST". Meanwhile, the IterationNumber of the SIB12 for segment transmission can also be implemented. In regard to the number of repetition times of the message and the number of repetition times of the SIB12, the reason for making repeated transmission in each is to ensure redundancy on a layer-by-layer basis, for example.

In the example of FIG. 8B, an example of IterationNumber="5" is illustrated, in which each SIB of the same content is transmitted five times consecutively. Also, as depicted in FIG. 8C, after the lapse of a message transmission period specified by "Repetition Period", the identical SIB12 is transmitted in repetition of which number of times is equivalent to the IterationNumber.

7. Operation Examples

Next, a description will be given on operation examples in the information distribution system 10 or the radio access system 20. In the present operation examples, the description will be given in the following order.

<7.1 An operation example of the CMAS radio utilization rate calculation function>

<7.2 An operation example of the CMAS transmission capability or incapability decision function>

<7.3 An operation example of the transmission SIB determination function>

The above-mentioned three operation examples are executed in the base station 300, for example. The base station 300 receives an "S1AP: WRITE-REPLACE WARNING REQUEST" from the MME 200, to discriminate whether or not the message concerned is a CMAS message. If the message concerned is a CMAS message, the base station 300 causes the received CMAS message to be input to the Telecom processing unit 320, so that each function of the CMAS radio utilization rate calculation function, the CMAS transmission capability or incapability decision function and the transmission SIB determination function is executed in the above order.

In the following, a CMAS message that the base station 300 receives in an i-th order may be referred to as a $CMAS_i$, for example. Also, each SCHEDULER is stored in the RRC information processing unit 340, and each SCHEDULER related to an SIB12 may be referred to as a $SCHEDULER^j$ ($1 \leq j \leq J$), for example.

<7.1 an Operation Example of the CMAS Radio Utilization Rate Calculation Function>

Figure 9:
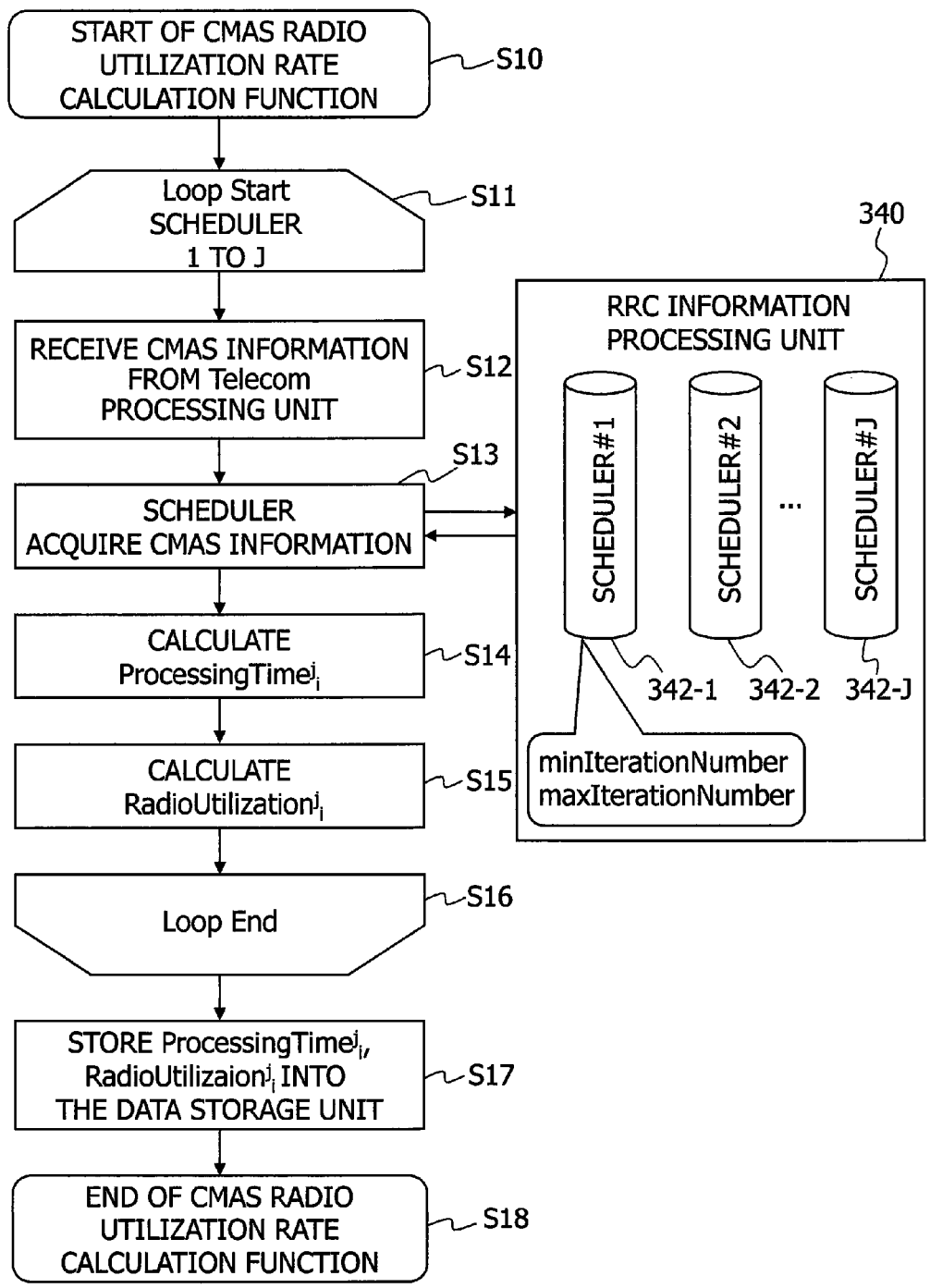
FIG. 9 is a flowchart illustrating an operation example of a CMAS radio utilization rate calculation function.

A description will be given on an operation example of the CMAS radio utilization rate calculation function. FIG. 9 is a flowchart illustrating the operation example of the CMAS radio utilization rate calculation function, and FIGS. 10A to 10E are diagrams for explaining the CMAS radio utilization rate.

The radio utilization rate calculation function 321, on starting the processing of the CMAS radio utilization rate calculation function (S10), performs the following processing on each SCHEDULER$^j$ (1≤j≤J) related to the SIB12 (511).

Namely, the radio utilization rate calculation function 321 receives CMAS information from the S1 processing unit 310 (512). In the following, parameter information included in the CMAS$_i$ may be referred to as CMAS information, for example.

Next, the radio utilization rate calculation function 321 acquires SCHEDULER information from the RRC information processing unit 340. (S13). In the following, information included in SCHEDULER$^j$ may be referred to as SCHEDULER information, for example.

Next, the radio utilization rate calculation function 321 calculates a ProcessingTime$^j_i$ (S14). The ProcessingTime$^j_i$ denotes, for example, a minimum time needed to complete the transmission of one CMAS$_i$ for each SCHEDULER$^j$.

Hereafter, an explanation will be given on the ProcessingTime$^j_i$. FIGS. 10A to 10C are diagrams for explaining the ProcessingTime$^j_i$. For example, a message content (CMAS#1) included in the CMAS$_i$ is divided into the number of segments=N. Also, in regard to the SIB12, it is assumed that two SCHEDULER (#1, #2) 342-1, 342-2 are stored in the RRC information processing unit 340. In the SCHEDULER (#1) 342-1, it is assumed that the transmission period of the SIB12 is "a [rf]" and the minIterationNumber is "a". Also, in the SCHEDULER (#2) 342-2, it is configured that the transmission period of the SIB12 is "b [rf]" and the minIterationNumber is "β".

In this case, when a message included in the CMAS$_i$ is to be transmitted using the SCHEDULER (#1) 342-1, a time needed to complete the transmission of a message content included in one CMAS$_i$ is $a \times N \times \alpha.$ The above "a×N×α" comes to a ProcessingTime$^j_i$ when the SCHEDULER (#1) 342-1 is used.

Also, when a message included in the CMAS$_i$ is to be transmitted using the SCHEDULER (#2) 342-2, a time needed to complete the transmission of a message content included in one CMAS$_i$ is $b \times N \times \beta.$ The above "b×N×β" comes to a ProcessingTime$^j_i$ when the SCHEDULER (#2) 342-2 is used.

From the above, it is possible to calculate the ProcessingTime$^j_i$ in the following manner. Namely, let the "si-Periodicity" of a j-th SCHEDULER$^j$ be si-Periodicity$^j$, and a "minIterationNumber" corresponding to the SCHEDULER$^j$ be a minIterationNumber$^j$. Also, let the number of segments of the message content included in the CMAS$_i$ be a SegmentNumber$_i$. In this case, each ProcessingTime$^j_i$ in the case of each SCHEDULER$^j$ can be represented as follows, for example.

ProcessingTime$^j_i$=SegmentNumber$_i$* sigmentNumbere$^j$*miniterationNumber$_j$   [Expression 2]

The ProcessingTime$^j_i$ represents, for example, a time (or radio resource) needed for the transmission of a message content included in one CMAS message through the SIB12 when the j-th scheduler is used for the i-th CMAS message. The ProcessingTime$^j_i$ takes a round-up value of [expression 2] to seconds, for example.

Referring back to FIG. 9, next, the radio utilization rate calculation function 321 calculates a RadioUtilization$^j_i$ which represents a CMAS radio utilization rate (S15). The RadioUtilization$^j_i$ represents, for example, the degree of a ratio of a time (or a radio resource) which is needed to transmit a CMAS message through the SIB12 with respect to a CMAS message transmission period (or all radio resources) for each scheduler. For example, "i" represents the order of a CMAS message, "j" represents the number of a target SCHEDULER, and the RadioUtilization$^j_i$ represents a CMAS radio utilization rate when the CMAS$_i$ is transmitted using the SCHEDULER$^j$.

FIGS. 10C and 10D are diagrams for explaining the RadioUtilization$^j_i$.

The ProcessingTime$^j_i$ when the SCHEDULER (#1) 342-1 is used for the CMAS$_i$ is calculated to be "a×N×α", and let the transmission period of the CMAS$_i$ be "RP". Then, RadioUtilization$^j_i$ when the SCHEDULER (#1) 342-1 is used is $(a \times N \times \alpha)/RP.$ Also, in the case that the ProcessingTime$^j_i$ when the SCHEDULER (#1) 342-1 is used is calculated to be "b×N× β", RadioUtilization$^j_i$ when the SCHEDULER (#1) 342-1 is used is $(b \times N \times \beta)/RP.$ From the way of thinking of the EDF scheduling, it can be considered that the above "Repetition Period" is the "deadline" of one-time CMAS message transmission. Further, in the case of repeated transmission of the SIB12 with as many as the IterationNumber, the base station 300 schedules the CMAS message transmission in such a manner as to be completed within the above "deadline".

It can be considered that a calculation result of a rough ratio of the ProcessingTime$^j_i$ to the CMAS message transmission period, which is also the "deadline", for each SCHEDULER is the RadioUtilization$^j_i$, for example.

In other words, the RadioUtilization$^j_i$ indicates the ratio of a time needed to transmit one CMAS message with respect to the CMAS message transmission period, on the basis of the repetition count of each divided SIB12 and the transmission period of each SIB12, for example.

From the above, let the "Repetition Period" of the CMAS$_i$ be a RepetitionPeriod$_i$, then the RadioUtilization$^j_i$ when the CMAS$_i$ is transmitted using the SCHEDULER$^j$ can be represented by the following, for example.

RadioUtilization$^j_i$=ProcessingTime$^j_i$/ RepetitionPeriod$_i$   [Expression 3]

Referring back to FIG. 9, next, the radio utilization rate calculation function 321 completes a loop to a target SCHEDULER (S16), and stores the calculated ProcessingTime$^j_i$ and the RadioUtilization$^j_i$ into the data storage unit 350 (S17).

FIG. 10E is a diagram illustrating an example of each RadioUtilization$^j_i$ which is stored in the data storage unit 350. In regard to the first CMAS#1, the RadioUtilization$^j_i$ is "0.2" if the SCHEDULER#1 is used, and the RadioUtilization$^j_i$ is "0.15" if the SCHEDULER#2 is used.

Additionally, it is possible to configure such that the radio utilization rate calculation function 321 stores the ProcessingTime$^j_i$ into the data storage unit 350.

Also, the radio utilization rate calculation function 321 stores each parameter included in each CMAS message in the data storage unit 350, for example.

Referring back to FIG. 9, next, the radio utilization rate calculation function 321 completes the processing of the radio utilization rate calculation function (S18).

Additionally, in consideration of each setting range of the "si-Periodicity" (SIB transmission period) and the "Repetition Period" (message transmission period), when an IterationNUmber$_i$ is set to be the minIterationNumber, a case that the RadioUtilization$^j{}_i$ exceeds "1" hardly occurs for the entire SCHEDULER$^j$.

However, for example, there may be a case that in spite that the IterationNumneri is set to be the minIterationNumber, the RadioUtilization$^j{}_i$ exceeds "1" for the entire SCHEDULER$^j$. In such a case, the radio utilization rate calculation function 321 corrects (or changes) the RepetitionPeriod$_i$ to a longer value than the specified RepetitionPeriod$_i$. As a method for correction, for example, it may be possible to be performed by the following:

$N \times ProcessingTime^j{}_i - RepetitionPeriod_i$ ($N$ is an integer of 2 or greater).

Also, when the data storage unit 350 stores, for example, the RadioUtilization$^j{}_i$ and the ProcessingTime$^j{}_i$ (S16), it is possible to set priority on each CMAS message by the CMAS stack function 351.

As to the priority, for example, the priority may be based on the reception sequence of each CMAS message or may be based on each type of the CMAS message. In the CMAS message, there are a variety of types of messages which range from a presidential message to a commercial product advertisement message etc., for example. Each type in the CMAS message may be discriminated based on the "Message Identifier" and the "Serial Number" (or either one) included in the CMAS message, for example.

For example, based on the "Message Identifier" and the "Serial Number" of the CMAS message received from the S1 processing unit 310, the Telecom processing unit 320 discriminates the type of the received CMAS message to decide the priority. Then, the Telecom processing unit 320 stores the decided priority into the data storage unit 350. For example, it may be possible to give the highest priority to the presidential message and the lowest priority to the commercial product advertisement, or the like. Such a decision criterion is stored in advance in the data storage unit 350, for example, so that processing is performed by reading out the decision criterion by the CMAS stack function 351 and the Telecom processing unit 320. In FIG. 10E, there is illustrated an example such that the priority is stored in the data storage unit 350.

Additionally, there may be a case that the base station 300 receives from the MME 200 a "KILL REQUEST", as an S1AP message. The "KILL REQUEST" is an S1AP message to instruct, after instructing message distribution, the suspension or cancellation of the distribution, for example. The "KILL REQUEST" includes, for example, a parameter of the CMAS message to be suspended. For example, the radio utilization rate calculation function 321 deletes the CMAS message from the data storage unit 350, on the basis of the parameter included in the "KILL REQUEST".

<7.2 an Operation Example of the CMAS Transmission Capability or Incapability Decision Function>

Figure 11:
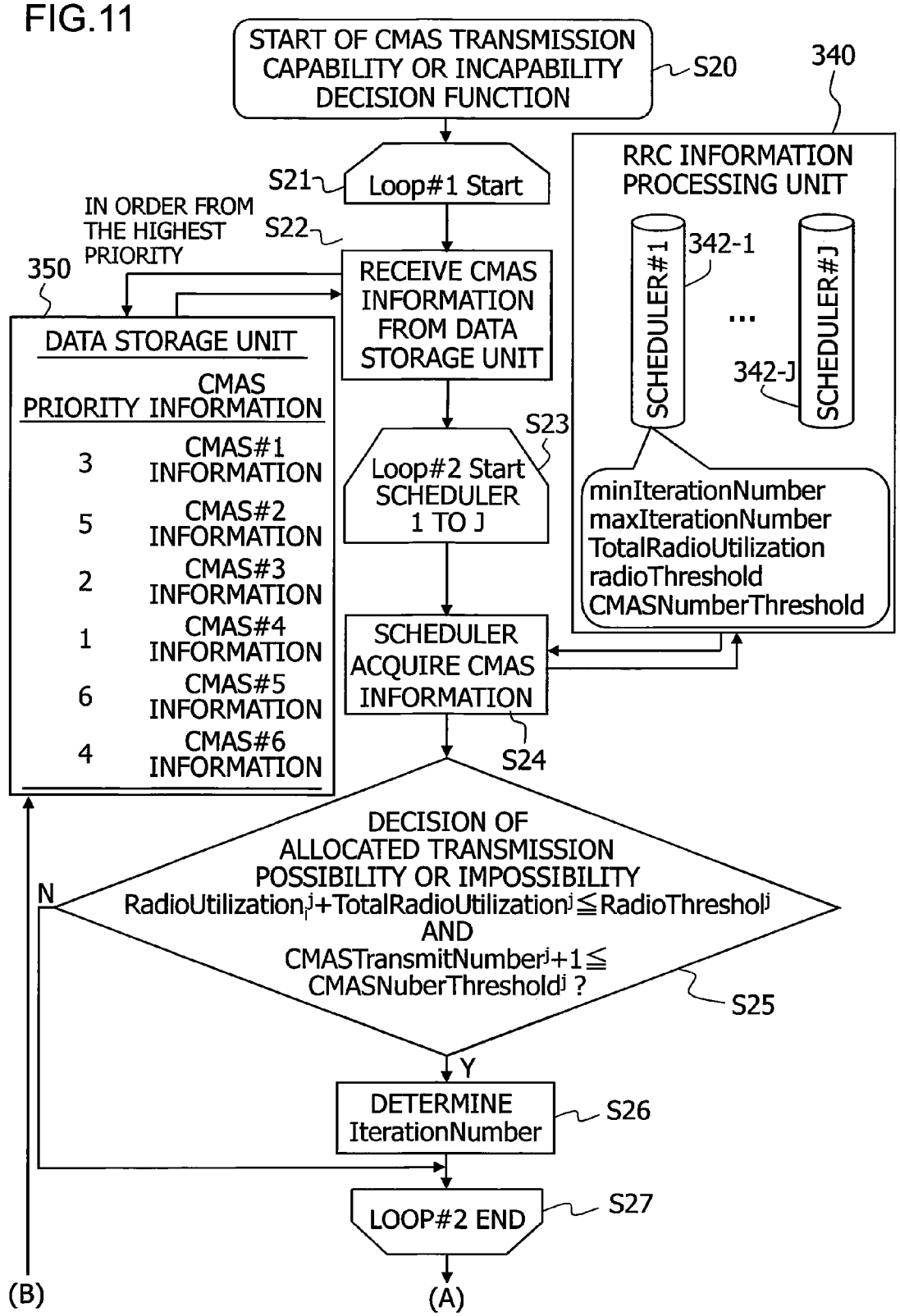
FIG. 11 is a flowchart illustrating an operation example of a CMAS transmission capability or incapability decision function.
Figure 12:
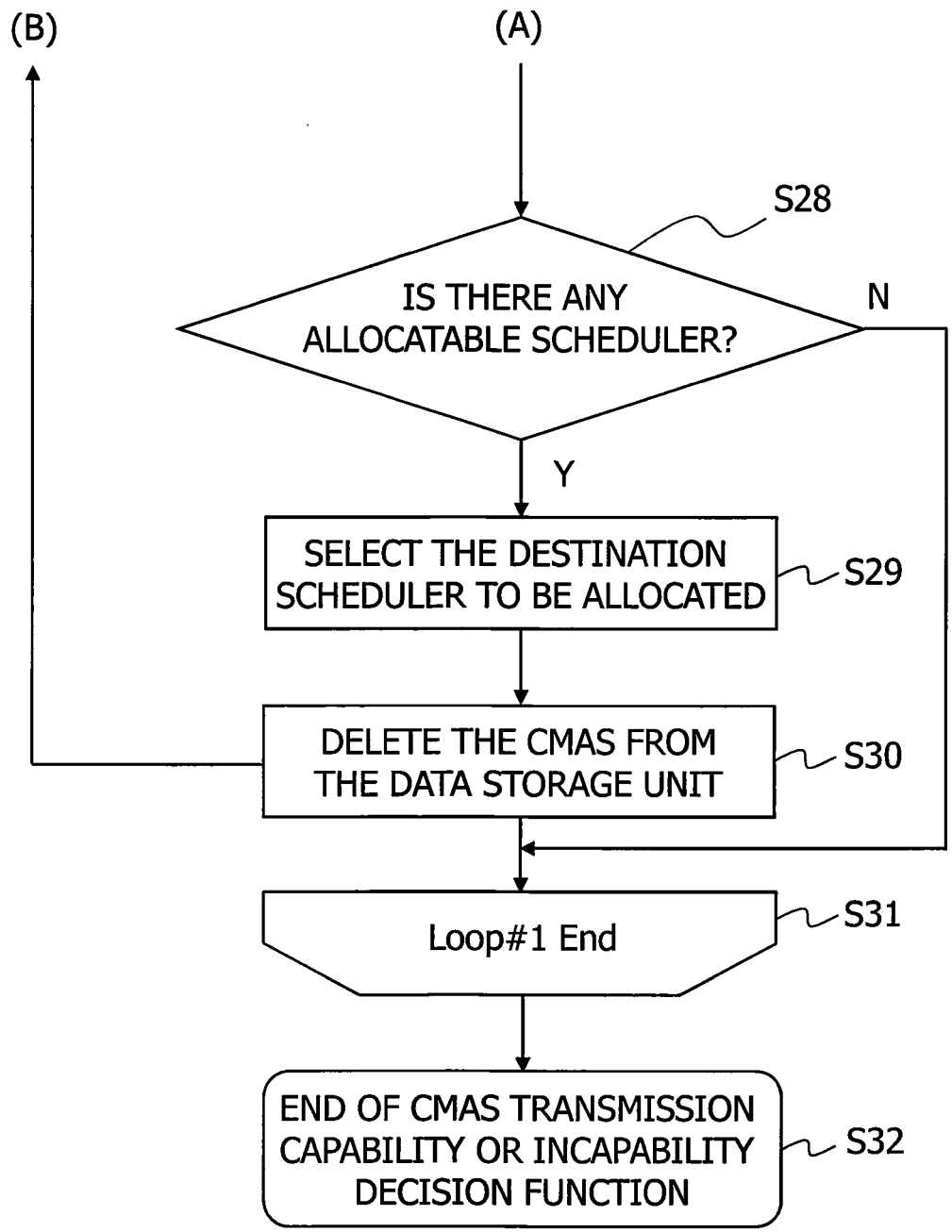
FIG. 12 is a flowchart illustrating an operation example of a CMAS transmission capability or incapability decision function.
Figure 14:
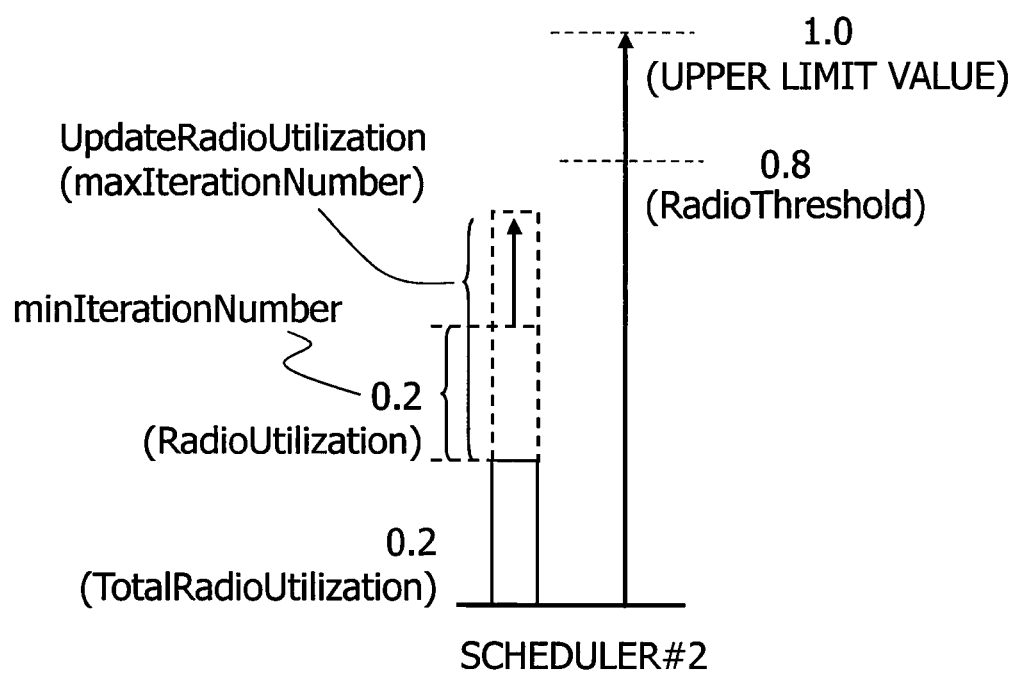
FIG. 14 is a diagram for explaining a CMAS transmission capability or incapability decision function.

Next, a description will be given on an operation example of the CMAS transmission capability or incapability decision function. The CMAS transmission capability or incapability decision function is executed in the transmission capability or incapability decision function 322, for example. FIGS. 11 and 12 are flowcharts illustrating an operation example of the CMAS transmission capability or incapability decision function, and FIGS. 13A to 14 are diagrams illustrating examples of CMAS transmission capability or incapability decision.

The transmission capability or incapability decision function 322, on starting the CMAS transmission capability or incapability decision function (S20), starts a Loop#1 (S21). The Loop#1 is a loop for each CMAS message which is stored in the data storage unit 350, and the transmission capability or incapability decision function 322 repeats the following processing for each CMAS message.

Namely, the transmission capability or incapability decision function 322 reads out CMAS information from the data storage unit 350 (S22). The transmission capability or incapability decision function 322 reads out the CMAS information of each CMAS message and each RadioUtilization$^j{}_i$ in order from the highest priority.

Next, the transmission capability or incapability decision function 322 starts a Loop#2 (S23). The Loop#2 is a loop for each SCHEDULER$^j$, and the transmission capability or incapability decision function 322 repeats the following processing for each SCHEDULER$^j$. The transmission capability or incapability decision function 322 performs the following processing for each SCHEDULER$^j$ in order from the CMAS message of the highest priority.

Namely, the transmission capability or incapability decision function 322 acquires SCHEDULER information from the RRC information processing unit 340 (S24). It is assumed that, in each SCHEDULER$^j$, there is stored the information of minIterationNumber, maxIterationNumber, TotalRadioUtilization, radioThreshold and CMASNuberThreshold in the RRC information processing unit 340 in association with each SCHEDULER$^j$.

The TotalRadioUtilization denotes, when each CMAS message is transmitted at each time, a total radio section utilization rate in each SCHEDULER$^j$ at the time point concerned, for example.

For example, there may be a case that, when a certain CMAS message is transmitted at a certain time using the SCHEDULER#1, another CMAS message is also transmitted at the certain time using the SCHEDULER#1. The total of CMAS radio utilization rates for each CMAS message transmitted using the SCHEDULER#1 comes to the TotalRadioUtilization, for example. The TotalRadioUtilization$^j$ in the SCHEDULER$^j$ can be represented by the following, for example.

$$TotalRadioUtilization^j = \sum_{CMAS_m \ in \ transmission \ by \ SchedulingInfo \ j} RadioUtilization_m \qquad [\text{Expression 4}]$$

The radioThreshold$^j$ is a value which is defined to be an upper limit value of the CMAS radio utilization rate, for example. It is assumed that the radioThreshold$^j$ is set to be a value which satisfies radioThreshold$^j \leq 1$.

The CMASNuberThreshold$^j$ is a value which is defined to be an upper limit value of the number of the CMAS messages, for example. It is assumed that the CMASNuberThreshold$^j$ is set to be a value which satisfies CMASNuberThreshold$^j \leq \infty$. Here, the total number of the CMAS messages to be transmitted by the SCHEDULER$^j$ is defined to be a CMASTransmitNumber$^j$, for example.

It is assumed that the transmission capability or incapability decision function 322 acquires, from the RRC information processing unit 340, the SCHEDULER information and the minIterationNumber, the maxIterationNumber, the TotalRadioUtilization, the radioThreshold, the CMASNuberThreshold each associated with the SCHEDULER concerned.

Next, the transmission capability or incapability decision function 322 performs the decision of allocated transmission capability or incapability (S25). The allocated transmission capability or incapability decision is performed, for example, by the transmission capability or incapability decision function 322 through the operation of "scanning whether or not there is 'SchedulingInfo' by which a CMAS message can be transmitted through an SIB12" and "selecting one SchedulingInfo among 'SchedulingInfo' by which a CMAS message can be transmitted".

First, with regard to the operation of "scanning whether there is 'SchedulingInfo' by which a CMAS message can be transmitted through an SIB12", a description will be given with examples depicted in FIGS. 13A to 13 C.

FIG. 13A illustrates an example of a CMAS radio utilization rate on a CMAS message#1. The CMAS radio utilization rate can take different values for each SCHEDULER$^j$, for example. As depicted in FIGS. 13B and 13C, the CMAS radio utilization rate is "0.2" when a SCHEDULER#1 is used for the CMAS message#1, whereas the CMAS radio utilization rate is "0.15" when a SCHEDULER#2 is used.

In this case, at a certain time, with regard to the SCHEDULER#1, a CMAS radio utilization rate of "0.6" is used by the transmission of another CMAS message. Also, with regard to the SCHEDULER#2, a CMAS radio utilization rate of "0.7" is used by the transmission of another CMAS message.

Further, it is assumed that "0.8" is set as an upper limit value of the CMAS radio utilization rate. Although a case that the upper limit value of the CMAS radio utilization rate comes to "1" can be considered when taking Expression 3 into consideration, for example. However, in consideration of a radio resource etc. in a radio section, a value smaller than "1" is currently set.

In such a case, when the SCHEDULER#1 is used for the CMAS message#1, there is obtained "0.6"+"0.2"="0.8" which is not greater than the upper limit value. On the other hand, when the SCHEDULER#1 is used for the CMAS message#1, there is obtained "0.7"+"0.15"="0.85" which exceeds the upper limit value.

For example, when the above-mentioned added value is not greater than the upper limit value, it follows that the SIB12 is scheduled within the range of a message transmission period ("Repetition Period") which is the deadline. However, when the added value exceeds the upper limit value, the schedule exceeds the "deadline" of the message transmission period.

Therefore, in the examples depicted in FIGS. 13B and 13C, the transmission capability or incapability decision function 322 selects the SCHEDULER#1 (or selects SchedulingInfo corresponding to the SCHEDULER#1). The above selection corresponds to the operation of "selecting one SchedulingInfo from among the "SchedulingInfo" by which the CMAS message can be transmitted. Thereafter, the transmission of the CMAS message#1 is performed using the SCHEDULER#1.

However, as described above, the upper limit value is provided for the number of the CMAS messages. This upper limit value is a CMASNuberThreshold$^j$, for example. The transmission capability or incapability decision function 322 counts a CMASTransmitNumber$^j$ for each SCHEDULER$^j$, and also confirms that the CMASTransmitNumber$^j$+1 is not greater than the CMASNuberThreshold$^j$.

Namely, for the selected CMAS, the transmission capability or incapability decision function 322 selects a SCHEDULER which satisfies the following.

$$\text{RadioUtilization}^j_i + \text{TotalRadioUtilization}^j \leq \text{RadioThreshold}^j \quad \text{[Expression 5]}$$

and $$\text{CMASTransmitNumber}^j + 1 \leq \text{CMASNuberThreshold}^j \quad \text{[Expression 6]}$$

The transmission capability or incapability decision function 322 selects a SCHEDULER which is optimal for the allocation of the received CMAS message from among SCHEDULER which satisfy both Expression 5 and Expression 6, for example.

In this case, as examples depicted in FIGS. 13B and 13C, if one SCHEDULER which satisfies Expression 5 and Expression 6 can be selected from among a plurality of SCHEDULER, the selected one SCHEDULER can become an "optimal SCHEDULER".

However, there may be a case that a plurality of SCHEDULER satisfy Expression 5 and Expression 6. In such a case, one "optimal SCHEDULER" is selected from among the plurality of SCHEDULER which satisfy Expression 5 and Expression 6.

As a selection method of the optimal SCHEDULER, there is a method for selecting a SCHEDULER which causes RadioUtilization$^j_i$+TotalRadioUtilization$^j$ to be minimal, for example. FIGS. 13D and 13E are diagrams illustrating a selection example in such a case.

RadioUtilization$^j_i$+TotalRadioUtilization$^j$=0.5 is given in the case of the SCHEDULER#1, whereas RadioUtilization$^j_i$+TotalRadioUtilization$^j$=0.35 in the case of the SCHEDULER#2. Accordingly, the transmission capability or incapability decision function 322 selects the SCHEDULER#2 (or SchedulingInfo corresponding to the SCHEDULER#2) in which a distance to the upper limit value "0.8" is the farthest (or there is the largest margin in the radio resource).

Referring back to FIG. 11, next, the transmission capability or incapability decision function 322 determines an IterationNumber (S26). The transmission capability or incapability decision function 322 determines the IterationNumber in the following manner, for example.

Namely, in the above-mentioned calculation of the CMAS radio utilization rate (for example, S10 in FIG. 9), for example, with regard to the number of times of transmission (or IterationNumber) of the identical SIB, the CMAS radio utilization rate is calculated by the minIterationNumber (for example, S14 and S15).

With regard to the number of times of transmission of the identical SIB, there are number of times from the minIterationNumber to the maxIterationNumber, and the number of times of transmission of the identical SIB therebetween is the IterationNumber$_i$.

Let a CMAS radio utilization rate corresponding to the IterationNumber$_i$ be an UpdateRadioUtilization$^j_i$. The UpdateRadioUtilization$^j_i$ is defined to be a CMAS radio utilization rate when the UpdateRadioUtilization$^j_i$ is recalculated after substituting the IterationNumber$_i$ for the minIterationNumber$^j$, for example. In such a case, for the IterationNumber$_i$, the transmission capability or incapability decision function 322 selects the number of times therefor within the range of satisfying the following.

$$\text{UpdatedRadioUtilization}^j_i + \text{TotalRadioUtilization}^j \leq \text{RadioThreshold}^j \quad \text{[Expression 7]}$$

As a method for selecting an IterationNumber$_i$, for example, there is a method of increasing to a radio resource limit related to the CMAS radio utilization rate. FIG. 14 is a diagram for explaining an example in the above case. In the example of FIG. 14, RadioUtilization$^j_i$+TotalRadioUtilization$^j$=0.4 is given. Further, RadioUtilization$^j_i$ when the IterationNumber$_i$ is changed up to the maxIterationNumber$^j$ satisfies Expression 7. In such a case, the transmission capability or incapability decision function 322 sets the IterationNumber$_i$ to be the maxIterationNumber$^j$.

On the other hand, there may be a case that UpdateRadioUtilization$^j_i$+TotalRadioUtilization$^j$ exceeds a RadioThreshold$^j$ when the IterationNumber$_i$ is changed to the maxIterationNumber$^j$. In such a case, the transmission capability or incapability decision function 322 selects an IterationNumber$_i$ which satisfies UpdateRadioUtilization$^j_i$+TotalRadioUtilization$^j$=RadioThreshold$^j$.

Referring back to FIG. 11, next, the transmission capability or incapability decision function 322 completes the Loop#2 (S27). Namely, the transmission capability or incapability decision function 322 completes the processing related to the SCHEDULER$^j$ selected in S23.

Next, the transmission capability or incapability decision function 322 discriminates whether or not there is an allocatable SCHEDULER (S28 in FIG. 12). For example, the discrimination by the transmission capability or incapability decision function 322 is made based on whether or not there is any of the SCHEDULER$^j$ selected in S23 that satisfies both Expression 5 and Expression 6.

If there is an allocatable SCHEDULER (Y in S28), the transmission capability or incapability decision function 322 selects the SCHEDULER to be allocated (S29). It is also possible to configure the transmission capability or incapability decision function 322 to select a SCHEDULER, which is selected before in S25, in the present processing, for example.

Next, the transmission capability or incapability decision function 322 reads out the SCHEDULER selected in S25 and the target CMAS message, from the RRC information processing unit 340 and the data storage unit 350, respectively, to notify the SIB generation function 323 (S30). At this time, the transmission capability or incapability decision function 322 deletes the corresponding CMAS information from the data storage unit 350.

Next, the transmission capability or incapability decision function 322 completes the Loop#1 to complete the processing on the target CMAS$_i$, so as to perform processing on a CMAS$_i$ of which priority is next to the highest (S31).

Then the transmission capability or incapability decision function 322 completes the processing related to the CMAS transmission capability or incapability decision function (S32).

On the other hand, if there is no allocatable SCHEDULER (N in S28), the transmission capability or incapability decision function 322 completes the Loop#1 without the processing of S29, S30, because there is no SCHEDULER by which the CMAS$_i$ can be transmitted (S31). The above is such a case that, among the entire SCHEDULER$^j$, there is no SCHEDULER that satisfies Expression 5 and Expression 6, for example.

The base station 300, on completing the CMAS transmission capability or incapability decision function, then performs the generation of an SIB12 by the SIB generation function 323.

The SIB generation function 323 generates the SIB12 on the basis of the number of segments etc. Thereafter, the transmission SIB determination function is executed in the transmission SIB determination unit 330, so that an SIB12 transmission schedule is determined.

<7.3 an Operation Example of the Transmission SIB Determination Function>

Figure 15:
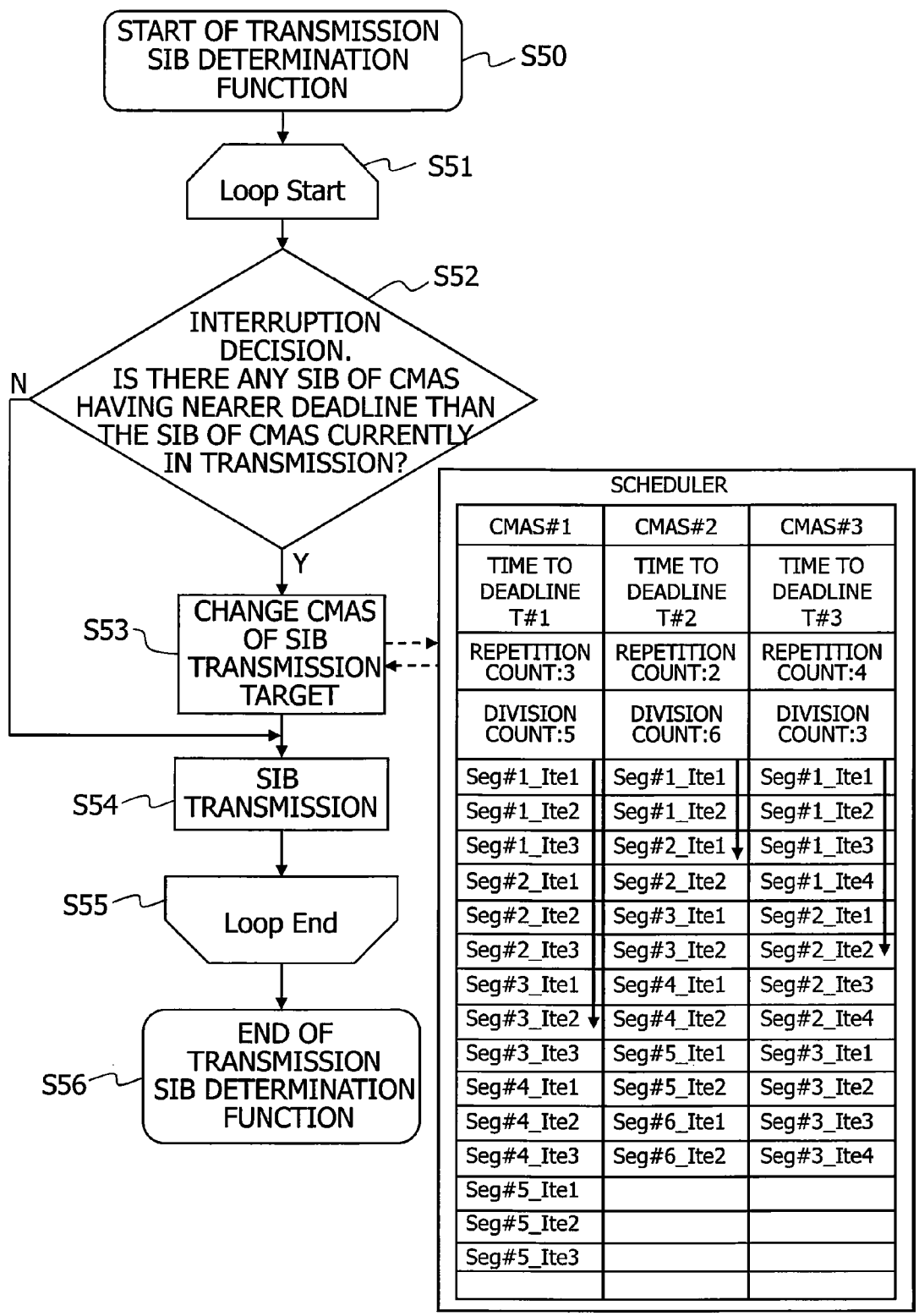
FIG. 15 is a flowchart illustrating an operation example of a transmission SIB determination function.

FIG. 15 is a flowchart illustrating an operation example of the transmission SIB determination function. The transmission SIB determination unit 330, on starting the processing of the transmission SIB determination function (S50), starts a Loop (S51). The above Loop is, for example, a loop for the SCHEDULER$^j$, and repeats the following processing for each SCHEDULER$^j$.

Namely, the transmission SIB determination unit 330 decides interruption (S52). More specifically, the transmission SIB determination unit 330 discriminates whether or not there is an SIB12 which is nearer to the "deadline" than an SIB12 currently in transmission. Such discrimination is associated with the EDF scheduling, for example.

In FIG. 15, there is illustrated an example of each transmission schedule when three CMAS messages are transmitted using a certain SCHEDULER$^j$. For the three CMAS messages, a time to each "deadline" of "T#1", "T#2", "T#3" is set. The "deadline" is, for example, the transmission period of each message ("Repetition Period").

In the case of above 1) described in the EDF scheduling, the SIB12 of a message of which deadline is the nearest (for example, CMAS#1 message) is transmitted. Also, in the case of above 2) described in the EDF scheduling, if there is any SIB12 of which deadline is nearer than an SIB12 which is already in transmission, the transmission SIB determination unit 330 interrupts the transmission of the SIB12 (for example, SIB12 of CMAS#1 message) which is currently in transmission, so as to transmit an SIB of which deadline is nearest (for example, SIB12 of CMAS#3 message).

Accordingly, if there is any SIB12 of a CMAS message of which deadline is nearer than the SIB12 of the CMAS message currently in transmission (Y in S52), the transmission SIB determination unit 330 changes a CMAS message of an SIB transmission target (S53).

Then, the transmission SIB determination unit 330 outputs the SIB12 of the CMAS message after the change, to the baseband processing unit 370 (S54).

On the other hand, if there is no SIB12 of a CMAS message of which deadline is nearer than the SIB12 of the CMAS message currently in transmission (N in S52), the transmission SIB determination unit 330 continues the transmission of the SIB12 of the CMAS message intact (S54).

Next, the transmission SIB determination unit 330 completes the Loop (S55), repeats processing until processing is completed for all SCHEDULER$^j$ (S51 to S55), and on completion of the processing for all SCHEDULER$^j$, completes the transmission SIB determination function (S56).

As described above, the base station 300 according to the present second embodiment is configured to determine an SIB12 transmission schedule on the basis of the CMAS radio utilization rate, when transmitting a CMAS message to the terminal 400 through the SIB12, for example.

As to the CMAS radio utilization rate, for example, the transmission schedule is determined in a manner to be completed within the range of a message transmission period, so that the CMAS message can be transmitted through an SIB12 within the range of a message transmission period which is specified from the MME 200. In this case, it is also possible for the base station 300 to repeat the transmission of the identical SIB12 within the range of the message transmission period.

Further, the base station 300 selects a SCHEDULER which includes a largest margin among a plurality of SCHEDULER (for example, S25 in FIG. 11). Therefore, it is also possible for the base station 300 to repeat up to the maximum value in regard to the number of repetition times of the identical SIB. Accordingly, it is possible to increase the probability of CMAS message reception at the terminal 400, as compared to a case when the number of repetition times of the identical SIB to the maximum value is not possible.

Further, the base station 300, when receiving a plurality of CMAS messages from the MME 200, determines a transmission schedule, for example, in order from a CMAS message of the highest priority (for example, S22 in FIG. 11). Therefore, it is possible to transmit each CMAS message in order from the CMAS message of the highest priority. Thus, it is possible to avoid such a situation that a CMAS message related to a commercial product advertisement is transmitted while being incapable of CMAS message transmission related to a presidential message, and it is also possible to avoid such a situation that scheduling is made in precedence from a CMAS message of which reception order from the MME 200 is subsequent.

Further, in regard to SIB12 transmission, the base station 300 is configured to perform transmission on the basis of the EDF scheduling (for example, S52 in FIG. 15). Therefore, it is also possible for the base station 300 to transmit an SIB12 with an effective use of a time before the "deadline" through the elimination of an idle time.

Thus, the base station 300 can perform efficient message transmission to the terminal 400.

Additionally, in the second embodiment, the description has been given on the example that the base station 300 carries the divided messages through the SIB12. However, it is not limited to the SIB12 as long as divided messages can be transmitted, and it is also applicable to other SIB, or block data or packet data which can be transmitted in a radio section with a predetermined size other than the SIB.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station apparatus that divides a message into a data of a transmittable size to a terminal apparatus, and transmits the divided data to subordinate all the terminal apparatuses by broadcast, the base station apparatus comprising:

a radio utilization rate calculation unit configured to calculate a radio utilization rate indicating a rate of a time for transmission of one of the message with respect to a transmission period of each the message in case of transmitting the message repetitively, based on a number of repetition times of each the divided data and a transmission period of each the divided data; and a transmission decision unit configured to determine a transmission schedule of the data based on the radio utilization rate.

2. The base station apparatus according to claim 1, wherein the radio utilization rate calculation unit is configured to calculate the radio utilization rate of each of a plurality of the transmission schedules, and the transmission decision unit is configured to determine any of the transmission schedules based on the radio utilization rate to each the transmission schedule.

3. The base station apparatus according to claim 1, wherein the radio utilization rate calculation unit is configured to calculate the radio utilization rate based on the number of repetition times of each the data, the transmission period of each the data, and a message size of the message.

4. The base station apparatus according to claim 3, wherein the message size indicates a number of each the data when the message is divided into the data.

5. The base station apparatus according to claim 1, wherein the radio utilization rate calculation unit is configured to calculate the radio utilization rate in case of setting the number of repetition times of the data to a minimum number lower than a first threshold value.

6. The base station apparatus according to claim 1, wherein the radio utilization rate calculation unit is configured to calculate another radio utilization rate with respect to another data of a transmittable size divided another message when the other data is transmitted to the terminal apparatus, and the transmission decision unit is configured to determine the transmission schedule based on a total value of the radio utilization rate and the other radio utilization rate.

7. The base station apparatus according to claim 6, wherein the transmission decision unit is configured to determine the transmission schedule of data when the total value is equal to or lower than a second threshold value lower than "1", and not to use the transmission schedule of data when the total value is more than the second threshold value.

8. The base station apparatus according to claim 6, wherein the radio utilization rate calculation unit is configured to calculate the radio utilization rate and the other radio utilization rate with respect to each of a plurality of the transmission schedules, and the transmission decision unit is configured to determine a transmission schedule that the total value of radio utilization rate and other radio utilization value is equal to or lower than a second threshold value lower than "1", as the transmission schedule of the data, and not to use a transmission schedule that the total value is more than the second threshold value, as the transmission schedule of data.

9. The base station apparatus according to claim 8, wherein the transmission decision unit is configured to determine a transmission schedule of the farthest distance to the second threshold value when there is a plurality of the transmission schedule that the total value is equal to or lower than the second threshold value, as the transmission schedule of data.

10. The base station apparatus according to claim 6, wherein
the transmission decision unit is configured to calculate each the radio utilization rate when the number of repetition times of data repeats from the minimum number until a maximum number more than a third threshold value, to the determined transmission schedule, to determine that the data is transmitted by the maximum number of times repetitively when the total value to the radio utilization rate in case of the maximum number is equal to or lower than the second threshold value, and to transmit repetitively the data by the number of repetition times of data that the total value is the second threshold value when the total value is more than the second threshold value.

11. The base station apparatus according to claim 1, wherein
the radio utilization rate calculation unit is configured to calculate the radio utilization rate every the message to a plurality of messages, and determine priority every the message, and
the transmission decision unit is configured to determine the transmission schedule of data in descending order of the priority of message based on the each radio utilization rate.

12. The base station apparatus according to claim 11, wherein
the radio utilization rate calculation unit is configured to determine the priority based on order of reception of the plurality of messages in the base station apparatus, or type of the message.

13. The base station apparatus according to claim 1, further comprising
a transmission determination unit, wherein
the transmission determination unit is configured to:
transmit with highest priority a first data that is close to the transmission period in comparison to a first transmission period of a first data and a second transmission period of a second data, and
stop transmission of the first data and transmit the second data when transmission of the second data is requested in case of transmitting the first data and when the transmission period is closer to the second transmission period than the first transmission period,
when the transmission determination unit is configured to transmit the first and second data divided first and second messages respectively based on the determined transmission schedule.

14. The base station apparatus according to claim 1, wherein
the base station apparatus receives the message and the number of repetition times of message from another apparatus.

15. The base station apparatus according to claim 1, wherein
the transmission schedule is the transmission period of data.

16. The base station apparatus according to claim 1, wherein
the data is a SIB (System Information Block Type) 12 and the massage is a message relating to a CMAS (Commercial Mobile Alert System).

17. A radio access system comprising:
a terminal apparatus; and
a base station apparatus which divides a message into a data of transmittable size to the terminal apparatus, and transmits the divided data to subordinate all the terminal apparatuses by broadcast, wherein
the base station apparatus includes:
a radio utilization rate calculation unit configured to calculate a radio utilization rate indicating a rate of a time for transmission of one of the message with respect to a transmission period of each the message in case of transmitting the message repetitively, based on a number of repetition times of each the divided data and a transmission period of each the divided data;
a transmission decision unit configured to determine a transmission schedule of the data based on the radio utilization rate; and
a transmission determination unit configured to transmit the data to the terminal apparatus according to the determined transmission schedule, and
the terminal apparatus includes:
a reception unit configured to receive the data transmitted from the base station apparatus.

* * * * *